US011410105B2

(12) United States Patent
Gill et al.

(10) Patent No.: US 11,410,105 B2
(45) Date of Patent: Aug. 9, 2022

(54) BLOCKCHAIN BASED SUPPLY CHAIN NETWORK SYSTEMS

(71) Applicant: Vertru Technologies Inc., New York, NY (US)

(72) Inventors: Jagjeet Gill, New York, NY (US); Gavin Nicol, Barrington, RI (US)

(73) Assignee: Vertru Technologies Inc., New York, NY (US)

( * ) Notice: Subject to any disclaimer, the term of this patent is extended or adjusted under 35 U.S.C. 154(b) by 0 days.

(21) Appl. No.: 16/920,307

(22) Filed: Jul. 2, 2020

(65) Prior Publication Data
US 2021/0004739 A1 Jan. 7, 2021

Related U.S. Application Data

(60) Provisional application No. 62/870,517, filed on Jul. 3, 2019.

(51) Int. Cl.
| | | |
|---|---|---|
| *G06Q 10/06* | (2012.01) | |
| *G06Q 10/10* | (2012.01) | |
| *G06Q 30/00* | (2012.01) | |
| *G06Q 30/02* | (2012.01) | |
| *G06Q 50/26* | (2012.01) | |
| *G06Q 50/28* | (2012.01) | |
| *H04L 9/40* | (2022.01) | |

(52) U.S. Cl.
CPC ....... *G06Q 10/0635* (2013.01); *G06Q 10/067* (2013.01); *G06Q 10/06393* (2013.01); *G06Q 10/10* (2013.01); *G06Q 30/0185* (2013.01); *G06Q 30/0201* (2013.01); *G06Q 50/26* (2013.01); *G06Q 50/28* (2013.01); *H04L 63/0428* (2013.01)

(58) Field of Classification Search
CPC ......... G06Q 10/0635; G06Q 10/06393; G06Q 10/067; G06Q 10/10; G06Q 30/0185; G06Q 30/0201; G06Q 50/26; G06Q 50/28; H04L 67/0428
See application file for complete search history.

(56) References Cited

U.S. PATENT DOCUMENTS

| | | | | |
|---|---|---|---|---|
| 10,521,806 | B2 * | 12/2019 | Cantrell | G06K 19/0717 |
| 2005/0131811 | A1 * | 6/2005 | Ranzini | G06Q 20/04 |
| | | | | 705/39 |
| 2012/0158601 | A1 * | 6/2012 | Rothley | G06Q 10/10 |
| | | | | 705/317 |
| 2012/0233044 | A1 * | 9/2012 | Burger | G06Q 10/06 |
| | | | | 705/32 |

(Continued)

*Primary Examiner* — Sujay Koneru
(74) *Attorney, Agent, or Firm* — Hamilton, Brook, Smith & Reynolds, P.C.

(57) ABSTRACT

A blockchain based supply chain network is provided. The network provides a supply chain monitoring system and marketplace including (a) raw materials, textile, and apparel sourcing marketplace, including services and capabilities, and textile, trim, components, accessories; (b) tracking system for engagement, environmental and social labor performance; (c) marketplace and transactional layer with an embedded blockchain platform that helps create trust between participants of the supply chain. The supply chain monitoring system and marketplace can provide a level of transparency and traceability fin the apparel market that has not been seen before in conventional supply chain systems.

19 Claims, 57 Drawing Sheets

(56) References Cited

U.S. PATENT DOCUMENTS

| | | | |
|---|---|---|---|
| 2014/0223284 A1* | 8/2014 | Rankin, Jr. | G06F 40/186 |
| | | | 715/234 |
| 2015/0039442 A1* | 2/2015 | Sidman | G06Q 30/0273 |
| | | | 705/14.66 |
| 2015/0073929 A1* | 3/2015 | Psota | G06Q 30/0605 |
| | | | 705/26.2 |
| 2016/0162588 A1* | 6/2016 | Tuchman | G06F 16/9535 |
| | | | 707/722 |
| 2017/0039500 A1* | 2/2017 | Leidner | G06Q 10/0833 |
| 2017/0102678 A1* | 4/2017 | Nixon | G05B 17/02 |
| 2018/0078843 A1* | 3/2018 | Tran | A63B 69/36 |
| 2018/0109541 A1* | 4/2018 | Gleichauf | H04W 12/06 |
| 2018/0285810 A1* | 10/2018 | Ramachandran | G06Q 30/04 |
| 2019/0005469 A1* | 1/2019 | Dhupkar | G06Q 20/24 |
| 2019/0114584 A1* | 4/2019 | Toohey | G06Q 10/083 |
| 2019/0165931 A1* | 5/2019 | Bharti | G06Q 20/02 |
| 2019/0258999 A1* | 8/2019 | Leonard | G06Q 10/08355 |
| 2019/0266553 A1* | 8/2019 | Jacobson | G06Q 10/087 |
| 2019/0280873 A1* | 9/2019 | Yang | G06Q 20/403 |
| 2019/0339668 A1* | 11/2019 | Biernat | H04L 63/12 |
| 2020/0074124 A1* | 3/2020 | Zografos | G16B 50/10 |
| 2020/0097869 A1* | 3/2020 | Bajaj | G06Q 10/06315 |
| 2020/0169465 A1* | 5/2020 | Stelmar Netto | H04L 67/10 |
| 2020/0211005 A1* | 7/2020 | Bodorik | G06Q 10/08 |
| 2020/0225643 A1* | 7/2020 | Tugbo | G05B 19/4155 |
| 2020/0226123 A1* | 7/2020 | Nixon | H04L 9/0643 |
| 2020/0226546 A1* | 7/2020 | Deshpande | G06Q 10/0833 |

* cited by examiner

| Tool | Focus |
|---|---|
| Social Labor Convergence Project | Social Compliance officer |
| Sustainable Apparel Coalition | Social Compliance officer |
| Sedex | Social Compliance officer |
| Fairfactories Clearing House | Social Compliance officer |
| Ecovadis | Not Fashion sector focused |

FIG. 11

|  | ILO Better Work | Bangladesh Accord | Stronger Together | IPE GCA China |
|---|---|---|---|---|
|  | BetterWork | ACCORD | stronger together | IPE |
| Transparency: | ✓ Publish labour standards efforts of factories across 9 countries (expanding) on website | ✓ Whilst is in transition, has, with Alliance, published factory results on website | ✓ List factories participation on website | ✓ Publish reports of pollution by & environmental efforts of factories in China & Buyers from them |
| Robustness: | ✓ ILO labour standards; assessment agreed in partnership with industry experts | ✓ Trade Union, NGO and intl Safety expert agreed standards | ✓ Labour standards expert assessors | ✓ Govt inspectors, then improvements verified by monitored Environmental expert auditors |
| Leadership: | ✓ ILO models ensure Trade Union engagement in dialogue, approval of approaches | ✓ Trade Unions and NGOs on the Board with Brand Buyer members | ✓ Trade Union partnership, engagement | ✓ Run by an NGO and a network of charities "Green Choice Alliance" |
| Capacity Building: | ✓ Ongoing training and consulting to guide factory labour standards improvement | ✓ Provided trainings for factory management and workers | ✓ Ongoing training programmes | ✓ Website provides guidance for how suppliers can engage experts to advise on how to remediate |

FIG. 12

| Initiatives which Indicate Social, Labour standards effort, and to tackle Modern Slavery | |
|---|---|
| Fair Labour Association FLA accredited company | Positive pts for Supplier membership |
| Fair Trade: | Positive points for participation |
| Fairwear | Positive points for participation |
| ILO Better Work Participating factories | Positive points for participation if in scope |
| ILO Better Work Transparency Database | Minus points if non-compliance published |
| ILO SCORE participant in past 2 years | Positive points for participation if in scope (less as results not published) |
| SA8000 | Positive points for participation if in scope (less as results not published) |
| Bangladesh Accord on Fire & Building safety | Positive points for participation if in scope (more points than Alliance as more robust), Minus pts if non-compliance published |
| Bangladesh Accord Remediated Suppliers | Highest pts, less for critical non-compliance |
| Bangladesh Alliance on Fire & Building Safety | Positive points for participation if in scope (less points than Alliance as less robust), Minus pts if non-compliance published |
| Factories transferred to Bangladesh Government Safety inspection program | Less than Alliance and Accord, but few pts as shows a supplier has been inspected and reports are publicly available. |
| YESS Yarn Ethical and Sustainably Sourced | Few pts for commitment |
| Initiatives which offer NGO-run Worker Hotlines: | |
| Handshake Worker Hotline (China, India) | |
| Unseen Modern Slavery Hotline UK | |
| LaborVoices | |
| Quizzr | |

| Tackle Modern Slavery | |
|---|---|
| Stronger Together Clear Voice | |
| FairHiring (Worker Agencies are accredited) | |
| IOM Programme | |
| | |

| Support Women Worker/Gender Rights: | |
|---|---|
| HERProject participant (within past 2 years) | |
| Women in factories Project Participant | |
| CARE PACE Programme | |

FIG. 14

| Initiatives which are Indicators of Environmental Efforts | |
|---|---|
| Textile Exchange (organic etc) | Points for participation |
| Sustainable Apparel Coalition | Points for participation |
| Better Cotton Initiative | Points for participation |
| Leather Working Group | Points for participation<br>Greater points for higher Grading |
| HK Sustainable Fashion Consortium | Points for participation (less as no field-work) |
| ZDCH (Zero Discharge of Hazardous Chemicals) | Points for participation |
| Italian Suppliers committed to DETOX | Points for participation (less as no field-work) |
| NRDC Clean By Design | Points for participation |
| Italian Sustainability, Ecology, Environment Commission | Points for participation (less as no field-work) |
| Bluesign | Points for participation |
| IPE GCA | Points for participation |
| Mekong Club | Points for participation |
| Amfori BEPI/BSCI | Points for participation |

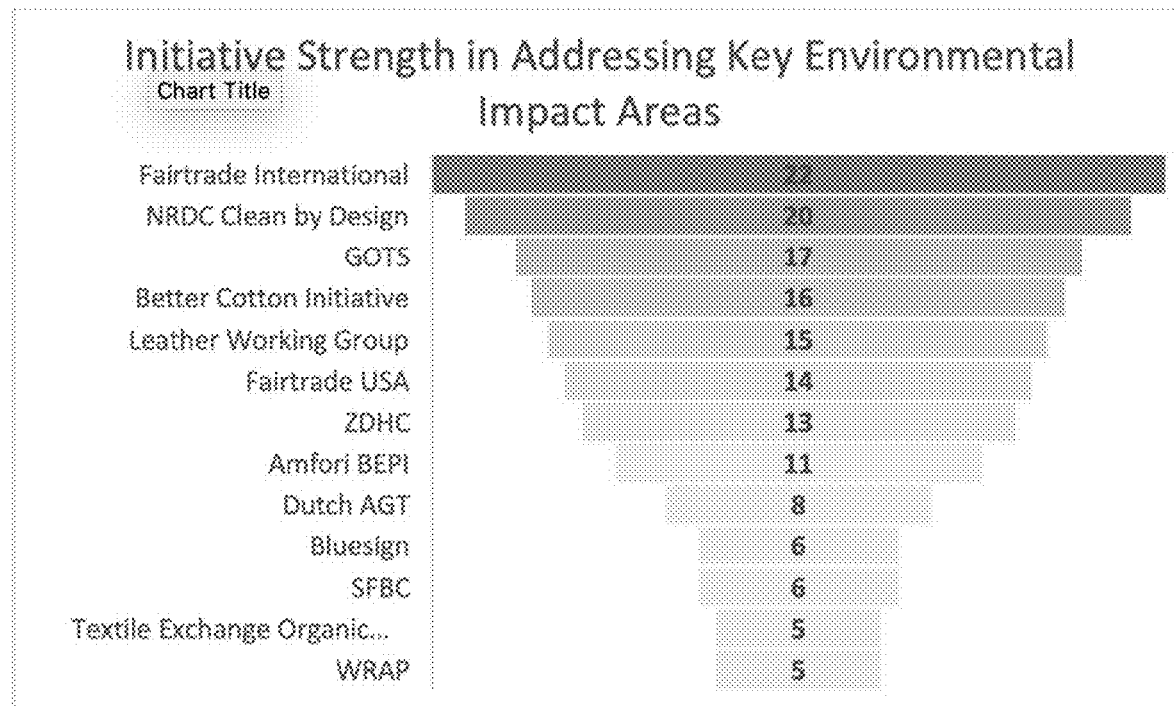
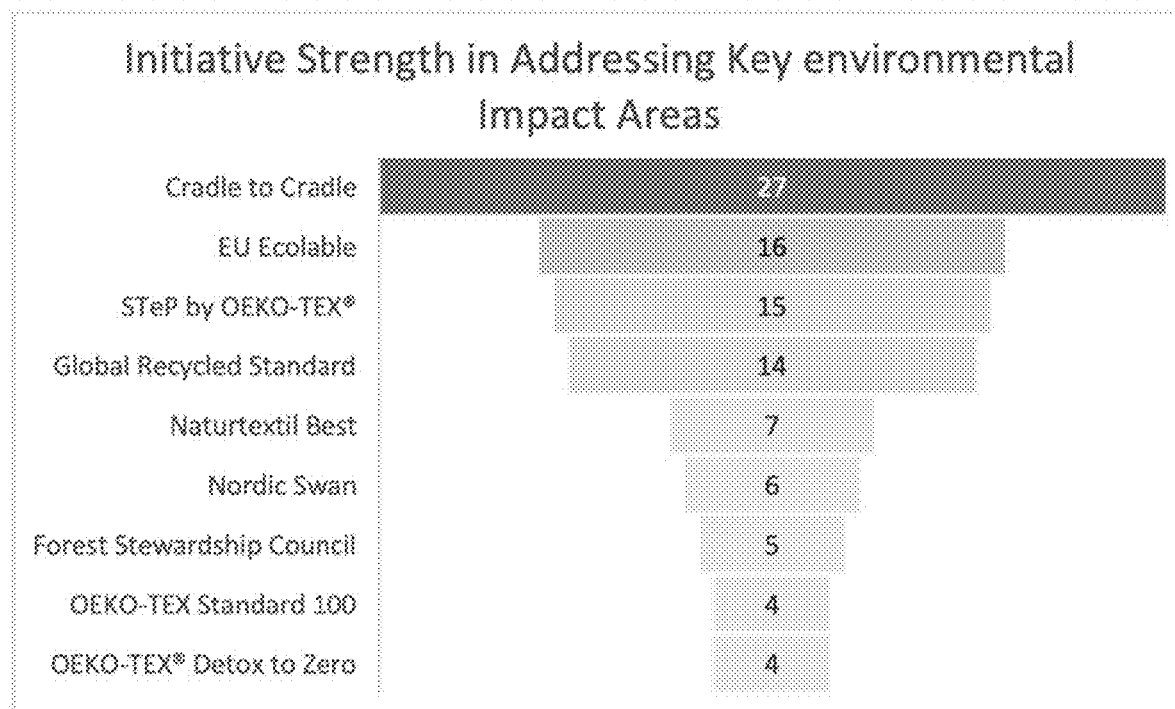
FIG. 59

BLOCKCHAIN BASED SUPPLY CHAIN NETWORK SYSTEMS

RELATED APPLICATION(S)

This application claims the benefit of U.S. Provisional Application No. 62/870,517, filed on Jul. 3, 2019. The entire teachings of the above application(s) are incorporated herein by reference.

BACKGROUND

Current supply chains suffer from being relatively opaque. This is further complicated by the fact that participants of the supply chain are usually independent from each other. Such independent entities in the supply chain do not readily share non-public information with one another. The resistance to share non-public information is at least partly due to security concerns. For example, supply chain participants have concerns about competitors having access to their sensitive information, and sometimes participants in the same supply chain may be competitive with one another. Where the data is available, it is largely self-reported. Consequently, the veracity and scope of the self-reported data may be an issue. There are agencies that monitor suppliers and publish information about their business practices, but each does so in their own silos. These issues, among others, make data integration difficult, unreliable, or of questionable provenance in supply chains.

SUMMARY

The above described issues can be further compounded by the lack of trust between participants in the supply chain. Not only is there generally a lack of trust between the entities in the supply chain, but it can be difficult, expensive, and inefficient to verify independently the accuracy of information publicly available about the entities in a supply chain. It is difficult, for example, to independently assess the credibility of marketing and business-related information provided about suppliers in a supply chain. If a participant in a supply chain engages in unethical business practices, it may tarnish the reputation of other entities in the supply by association. Consider, for example, that if an entity in the supply chain engages in unethical environmental or labor practices, then the business reputation of any other entity in the supply chain may likewise be damaged by association.

Consequently, in today's dynamic, global retail environment, it is important to ensure that the business practices of each entity in the supply chain can be independently verified. Certain aspects of the present invention solve these problems by providing transparency about each entity in the supply chain, and attesting to their trustworthiness. If an entity is not considered trustworthy, it may be denied access to the inventive blockchain based supply chain network systems. For example, independently verified information is attested to with respect to each entity in the supply chain. In this way, certain technical features of the invention enable a participant in the supply chain to ensure that the other entities in the supply chain have honorable business practices, with respect to their social labor and environmental standing. The inventive system can score the respective entities in the supply chain based on independently attested to facts about their business practices.

According to an aspect of the invention, a blockchain based supply chain network systems may be provided that fuses technical components to create a blockchain based supply chain network that includes (a) raw materials, textile, and apparel sourcing marketplace, including services and capabilities, and textile, trim, components, accessories; (b) tracking system for engagement, environmental and social labor performance; (c) marketplace and transactional layer with an embedded blockchain platform that helps create trust between participants of the supply chain. The data may be used to make decisions about business aspects, such as financing for the businesses. With the invention described above, a level of transparency and traceability can be reached in the apparel market that has not been seen before in conventional supply chain systems.

As described in more detail below, the inventive blockchain based supply chain network systems can:

a) provide a mechanism for easily collecting data from anywhere in the supply chain, b) ensure data integrity as data are propagated, c) protect data privacy both inflight and at rest, d) ensure the entities generating data are identifiable, and e) provide nonrepudiation, such that if an entity produces data, they can never deny that they produced such data. This last point can be considered crucial for protecting against fraudulent activities, and reaching a level of transparency in the retail/apparel market.

Embodiments of the present invention apply trusted computing technology to increase the level of assurance of a participant in the inventive blockchain based supply chain network systems. Using the trusted environment, embodiments may also compute the trust score of a participant in the supply chain network based on processing verified information extracted from independent third-party sources using a trust scoring algorithm (scoring engine).

Example embodiments of the inventive blockchain based supply chain network includes computer methods, systems, and program products for monitoring participants of the supply chain, and executing supply chain transactions, including handing RFPs, RFQs, and credit transactions. The computer program products comprise a non-transitory computer-readable storage medium having code instructions stored thereon, the storage medium operatively coupled to a processor to execute the computer method embodiments. The computer systems comprise a client device, an attestation server, one or more additional attestation servers, and a transaction network.

The computer methods, systems, and program products of the inventive blockchain based supply chain network systems include implementations that transmit an RFP request from a client device to an attestation server. The read request is signed and securely transmitted from a trusted execution environment on the client device. The computer methods, systems, and program products receive at the attestation server the securely transmitted read request. The attestation server is configured with a consensus of the supply chain transaction network. The computer methods, systems, and program products handle the RFP requests by the consensus of the system based on the trust scores assigned to the participants of the supply chain network. A supplier, for example, may be awarded an opportunity to bid on the RFP or RFQ if the consensus algorithm/engine determines the supplier's trust score meets a certain threshold. Other supplier(s) may be denied an opportunity to bid on the RFP/RFQ if the consensus of the blockchain network and supplier monitoring system of the invention is the respective supplier does not meet a certain threshold level of trustworthiness. Along these lines, the trustworthiness of respective participants of the supply chain may be weighed based on their environmental and labor practices. These entities may be assigned a reputation token that represents a measure of this trustworthiness. The computer methods, systems, and program products transmit the RFP/RFQ response to the client device. The RFP/RFQ response is signed and securely transmitted to the requesting party, as well as being recorded on the blockchain.

The computer methods, systems, and program products of the inventive blockchain based supply chain network systems may consider the integrity of a system of a participant (e.g. supplier, manufacture, contractor, vendor, etc.) in the inventive blockchain based supply chain network by executing a consensus calculation, including at least one of: proof-of-work (PoW), proof of stake (PoS), delegated proof of stake (DPOS), proof-of-identify (PoI), proof-of-elapsed-time (PoET), and proof-of-importance. Based on the computation, the computer methods, systems, and program products securely transmit the validated and signed read response and include that in the computation of the entity's trust score.

If the validated state of the consensus client does not determine a consensus of the node in the supply chain, the computer methods, systems, and program products may determine that the node (e.g. participant of the supply chain) cannot be attested to in terms of its trust score or reputation scoring.

In some embodiments of the inventive blockchain based supply chain network systems, if a threshold trust score is not met, the computer methods, systems, and program products may deny a node access to the inventive blockchain based supply chain network.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 5 and 6 show example system components for generating trust scores to associate with data collected in the inventive blockchain based supply chain network systems and associated derivations thereof.

FIG. 11 shows example integrated ESG Tools in the inventive blockchain based supply chain network systems.

FIG. 12 shows examples of such models included in the scoring algorithm (scoring engine) according to an embodiment.

FIGS. 14 and 15 show example Social/Labour Standards monitoring Initiatives included as factors for the scoring engine.

FIGS. 17-57 are example screenshots of an example implementation of the inventive blockchain based supply chain network systems.

FIGS. 58 and 59 are diagrams of output of the environmental scoring algorithm according to an embodiment.

DETAILED DESCRIPTION

Figure 1:
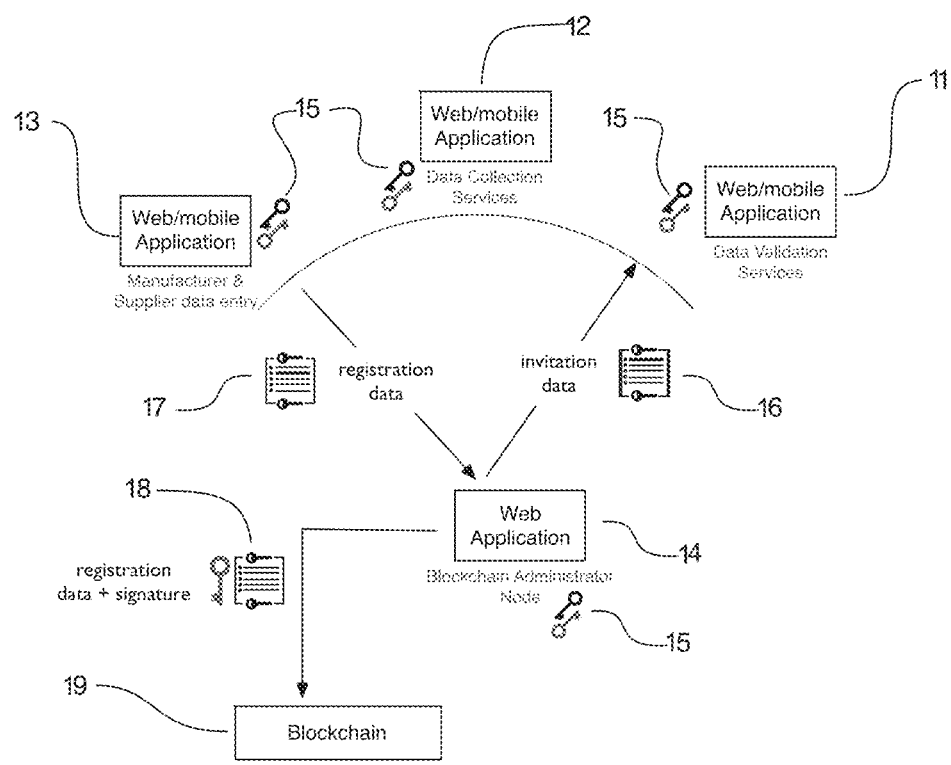
FIG. 1 is an example embodiment of the inventive blockchain based supply chain network systems.

A description of example embodiments follows.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

Apparel retail and consumer goods generally are facing many challenges today, each largely driven by the so-called new consumer, who is empowered, informed and enabled by the Internet. This savvy set of shoppers is changing the face of retail and necessitating updates across the entire supply chain. Among these overhauls is the need to supply a sometimes exhaustive level of detail about the origins of each of its products. Emerging from concerns for the environment, workers' rights and their own well-being, younger consumers especially are looking for brands to disclose more about what goes into their garments and prove the marketing claims they make—an expectation the apparel industry is ill-equipped to meet currently.

Sourcing Journal surveyed the apparel industry about transparency: the reasons why it is on the radar now, the progress companies are making, the scope of the challenge and the plans for making further improvements. What was revealed is that while consumers are one major catalyst, they're not the only reason the market has acknowledged a need to know what's happening across the supply chain. Other motivators include potential monetary gains, environmental benefits and brand reputation opportunities as well as the ability to hold supply chain partners more accountable.

To that end, all but a slim minority of companies represented in the poll either currently have transparency initiatives in place or will enact them within the next five years.

Ticking off the advantages is one thing. Envisioning a time when the industry will reach full transparency proved more difficult for respondents. The biggest challenge, they noted, is the size, scope, complexity and often circuitous nature of the global supply chain. With goods moving from hand to hand, across companies, countries and even continents, it's understandable why tracking and verifying inputs, processes and workers would be a daunting undertaking. As one respondent put it, it is "a very large ship to turn around."

And the survey revealed the industry is looking to brands to lead the charge. That said, the general sentiment seemed to be that their responsibility primarily consists of pressuring their partners to fall in line. How mills, factories and suppliers would adopt the practices and absorb the related costs was unclear, though a few respondents expressed their belief that brands—and retailers—have to be prepared to offer some measure of financial support or incentives.

Beyond investing in its partners, respondents noted costs related to things like new technologies, certifications or inspections pose a challenge for an industry that is always price conscious and currently cash-strapped due to the major upheavals at the retail level. Earmarking the dollars for transparency related improvements is a highlevel decision that reflects a company's corporate culture and commitment to change. More than one industry insider from the survey noted the mandate must start at the top, stating, "Unless transparency is driven by owners/shareholders/CEOs it won't happen. Companies who prioritize [sic] profit will fall behind."

Aspects of the invention leverage blockchain based cryptographic identity registration to create blockchain based identities for the suppliers, manufactures, contractors, retailers, businesses, and other participants in the inventive blockchain based supply chain network systems. In this way, the inventive blockchain based supply chain network systems can create a blockchain based supply chain that is largely more transparent to end users than previously available in conventional supply chains. With this implementation, embodiments of the invention can help consumers and other participants in the supply chain have access to an exhaustive level of detail about the origins of each of its products.

Supply Chain Based Blockchain—Identity Registration

In one example preferred embodiment of the inventive blockchain based supply chain network systems, entities and data in the collection process of are secured cryptographically using a combination of public key cryptography and identity registration on a blockchain. An example implementation of this registration process is shown in FIG. 1. Referring to FIG. 1, in accordance with an embodiment of the inventive blockchain based supply chain network systems, registration, data validators 11, data collectors 12, manufacturers and suppliers 13 and administrator nodes 14, will all generate a public/private keypair 15, possibly in the form of X509 certificates. In order to become part of the network, an administrator node 14 will send a cryptographically signed invitation 16 to an entity wishing to join into the network. The receiving entity will then return the invitation along with additional signed registration data 17, including, but not limited to, the public key of the entity. The administrator node 14 will then sign the registration data 18, and then register the registration data 18, to a blockchain 19.

This sequence of steps is sufficient to not only provide dissemination of public keys that can be used for message verification in the future, but also forms a directed network of participants showing who invited a given participant, based on the cryptographic signatures of the signed registration data 18, thereby imparting a further degree of security and transparency to the network.

Using Blockchain to Collect Supply Chain Performance Metrics

The inventive blockchain based supply chain network systems can be used to collect and propagate metric information from within a supply chain by:

a) Using blockchain systems for secure and verifiable collection of metrics.

b) Using blockchain systems and related cryptography for managing privacy and security of data.

c) Using collection techniques, including leveraging mobile technologies etc. This can be couched in terms of well-known problems with instrumentation of supply chains etc. and how untrustworthy existing systems are, offering blockchain as a better alternative.

Figure 2:
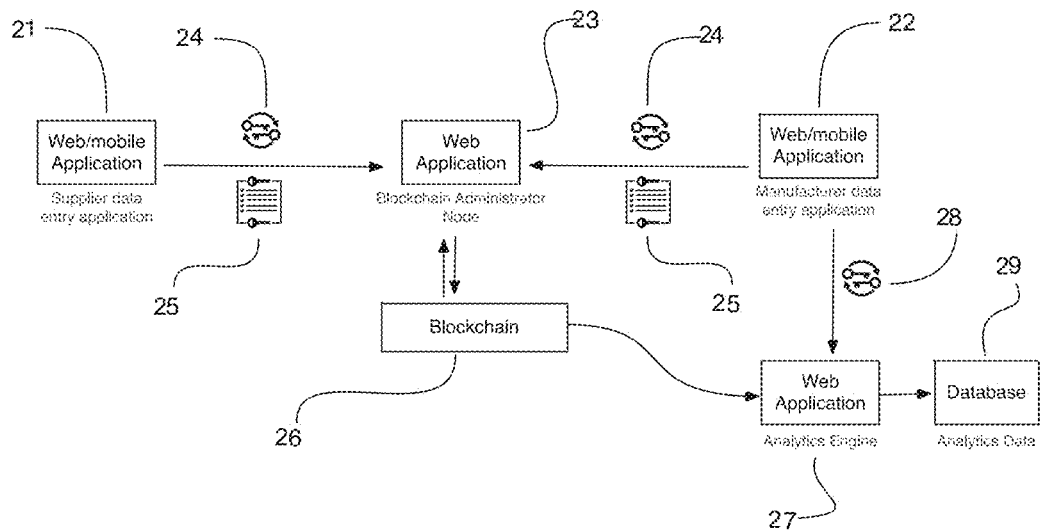
FIG. 2 shows an example system for collecting metrics in a secure and valid manner in a supply chain.

FIG. 2 shows an example system for collecting metrics in a secure and valid manner in a supply chain. In the context of an embodiment of the invention, suppliers 21, and manufacturers 22, will send signed and encrypted data 25 to a blockchain administrator node 23 by first performing a cryptographic key exchange 24 in order to derive a shared secret. The signed and encrypted data 25 is encrypted using this shared secret and signed by the supplier 21 or manufacturer 22, for transmission to the blockchain administrator node 23. The blockchain administrator node then writes the data to the blockchain 26 after which other nodes, such as analytics nodes or market nodes 27 may receive a copy of the data. If they wish to access the data, the node preferably first performs a cryptographic key exchange 28 in order to derive a decryption key that can then allow data to be accessed and stored in a local database 29.

Using Blockchain for Supply Chain Performance Verification

According to an aspect of the inventive blockchain based supply chain network systems, blockchain is used to allow 'verifiers' to enter data that indicates the degree of compliance of participants etc.

Conventional supply chains suffer from being largely opaque (at least partly due to security concerns), and where there is data available, on largely self-reported data. In order to decrease the risk of fraudulent data, an embodiment of the present invention provides a mechanism for auditing data via 3rd parties (validators). While conventional systems have considered such validators, such data exists outside of the supply chain ecosystem.

Hence, aspects of the present system provide: a) mechanism for easily collecting verification data from anywhere in the supply chain, b) ensures data integrity as data are propagated, c) protects data privacy both in-flight and at rest, d) ensures the entities generating data are verifiable even if anonymous, e) provide non-repudiation, such that if an entity produces data, they can never deny that they produced such data—it should be noted that this last point may be crucial for protecting against fraudulent activities, and f) a means for collecting 'attestations' or 'certifications' of compliance or non-compliance, even for anonymous users.

Figure 3:
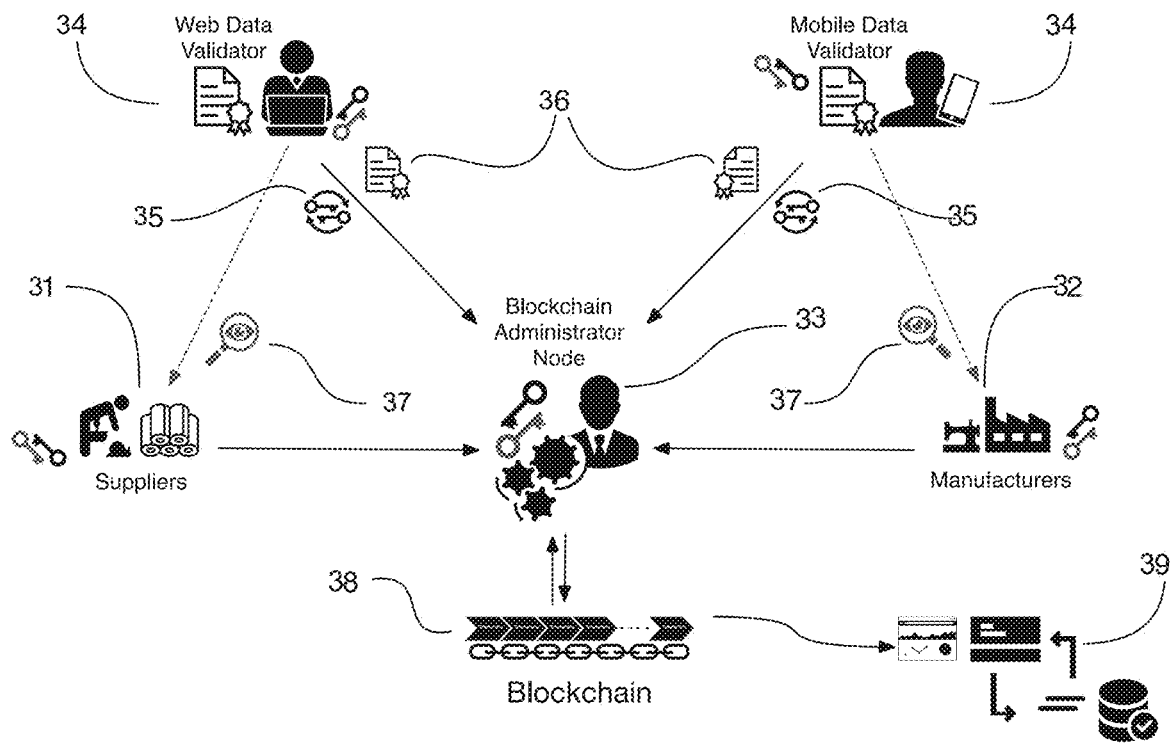
FIGS. 3 and 4 show example implementations of systems for collecting validation data in a secure and valid manner in a supply chain according to an aspect of the invention.
Figure 4:
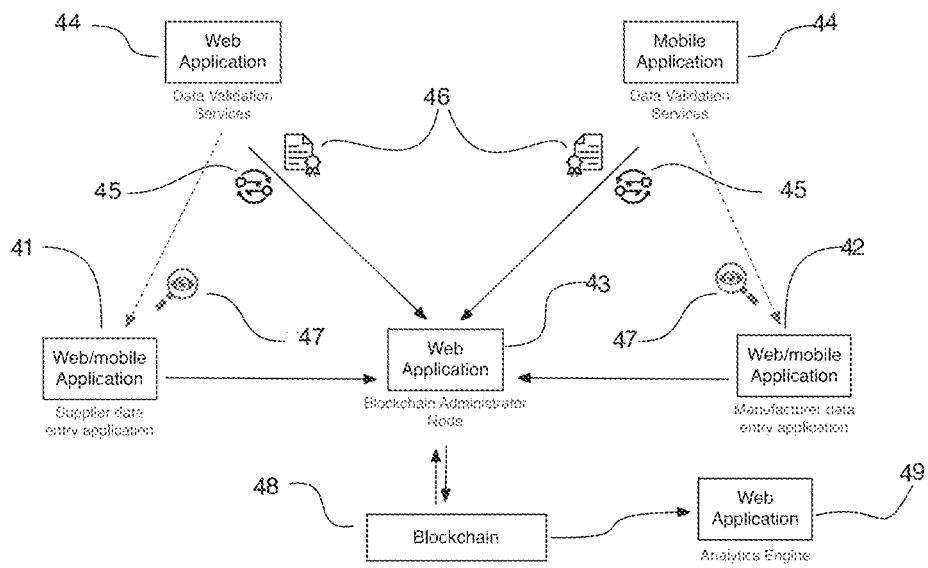

FIGS. 3 and 4 show example implementations of the system for collecting validation data in a secure and valid manner in a supply chain according to an aspect of the invention.

Referring to FIGS. 3 and 4, in accordance with an aspect of the inventive blockchain based supply chain network systems, suppliers 31, 41 manufacturers 32, 42 and other ecosystem participants (herein "participants" or "entities"), submit data related to compliance and performance to a blockchain administrator node 33, 43 which will then submit it to the blockchain 48 as depicted in FIG. 4. While this is useful for self-reported data, in order to reduce the likelihood of fraud, data validators 34, 44 (web, mobile, etc.) are included in the ecosystem. Such validators inspect data provided by suppliers, manufacturers, and other ecosystem participants in order to form an opinion. Their evaluation 36, 46 is sent to a blockchain administrator node 33, 43 by first performing a cryptographic key exchange 35, 45 in order to derive a shared secret, after which the evaluation 36, 46 is sent to the blockchain 38, 48 and then potentially aggregated in an analytics or search service 39, 49. Generally, the form of the evaluation will be easily machine processable in order to fully evaluate and integrate the statement of compliance. Note that because validators are introduced into the ecosystem via the registration process outlined above, there is an explicit trust network formed, such that fraudulent behavior by validators will reflect negatively on the entities that introduced them into the ecosystem. Note also that the use of cryptographic identities rather than personally identifiable information makes it possible for anonymous users to report infringements or otherwise make statements, with the trust and data integrity guarantees engendered by the user of the blockchain.

In one embodiment of this invention tokenomics may be used to incentivize validators to participate. In such case validators 1 . . . n to form a pool, and when validation data are submitted, a validator has to stake n tokens for n days (i.e. put them in escrow), and if within that period another validator proves that the data is invalid (also by staking), the initial validator would lose their tokens. A much weaker form of this is to require a quorum of validators to approve an evaluation before the data are accepted, and for all validators in the quorum to be rewarded. Without staking, this is subject to collusion attacks.

In a further embodiment of this invention tokenomics mechanism is also applicable to data collection, though direct compensation for good behavior, rather than staking would likely be more effective there.

Using Blockchain to Provide Metrics with Trust Scores

The focus on this aspect of the inventive blockchain based supply chain network systems leverage blockchain in the context of the supply chain, to provide metrics computations in both a provably correct and privacy-protecting manner. Specifically, from the above:

a) Data that is being acted upon (calculations performed) can be 'trusted' to the degree that the collectors and verifiers can be trusted;

b) Coupled with blockchain registration of the 'models' or 'calculation engines', the combination of data+computation can be made 'immutable' and hence fully auditable over time;

c) Use of zero-knowledge (range) proofs to ensure data falls within a range (in some preferred embodiments, it is desirable to use group signatures, shared secrets etc. with data collection and/or verification);

d) Calculation of a 'degree of trust' in data and analytics outputs based on the aggregate trust scores of the data sources and analytics suppliers; and e) This 'trusted computation engine' can be used to provide additional guarantees to the sustainability metrics patents.

Given the ability to collect data within a supply chain, it is important to establish how much trust can be placed on the data. This is true for both self-reported data as well as for 3rd party data. This 'degree of trust' or 'confidence' in data can influence buying decisions, financing decisions, etc. etc. because it reflects the degree of 'risk' in the data as an inverse of trustworthiness ('trust' can be seen as the amount of risk one is willing to take on based on the statements of a 3rd party). Current systems provide no means for collecting, let alone automatically deriving trust scores. Hence there is a need for a system that a) provides a mechanism for associating a 'trust score' with data, b) for automatically calculating trust scores based on # times an entity has been proven to be unreliable, c) for a means of using trust scores to derive trust scores on derivates of collected data.

There is a fairly large literature on reputation scores (for example The Oxford Handbook of Gossip and Reputation), but the simplest means for generating a 'trust' score is to simply use binary accuracy/precision (following from Wikipedia):

$$\text{Accuracy}=(TP+TN)/(TP+TN+FP+FN)$$

$$\text{Precision}=(TP)/(TP+FP)$$

where: TP=True positive; FP=False positive; TN=True negative; FN=False negative

For this kind of application, Precision is sufficient.

Figure 5:
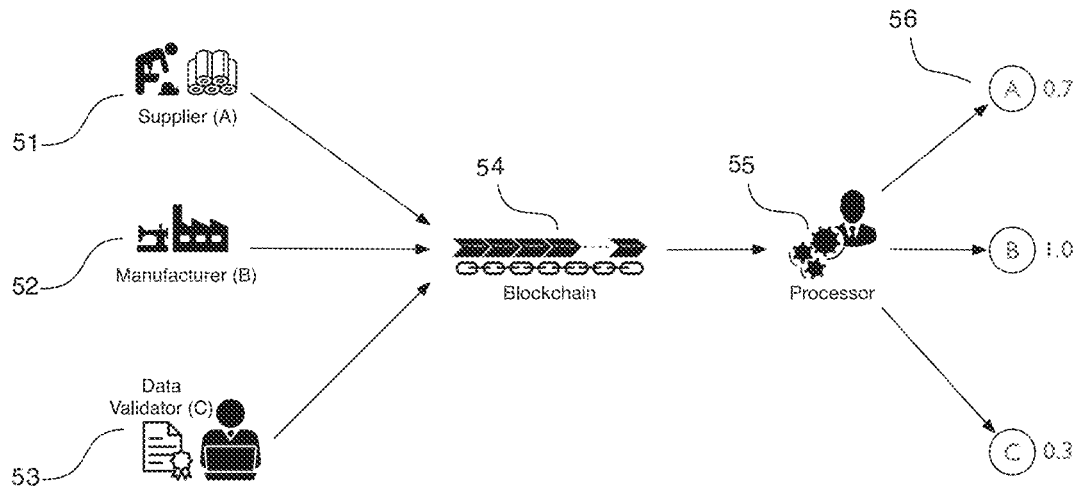
FIG. 5 shows an example system for generating trust scores to associate with data collected in the inventive blockchain based supply chain network systems and associated derivations thereof.
Figure 6:
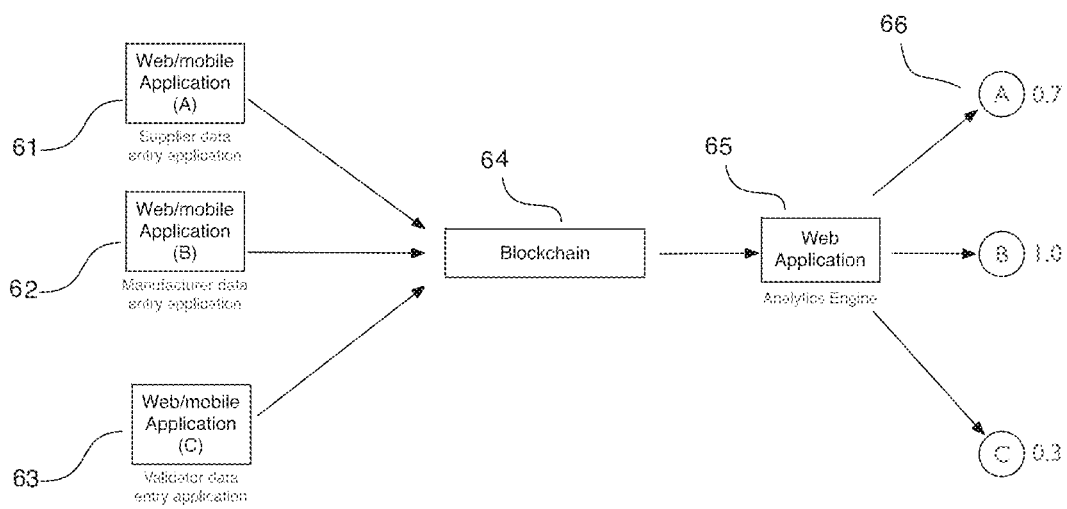

FIGS. 5 and 6 show example system components for generating trust scores to associate with data collected in the inventive blockchain based supply chain network systems and associated derivations thereof.

Suppliers 51, 61, manufacturers 52, 62, validators 53, 63 and other ecosystem participants, will submit data related to compliance and performance to a blockchain 54, 64. In this case, the blockchain 54, 64 is essentially being used as an immutable, fully auditable, and verifiable database containing all data produced by the ecosystem participants. A processor 55, 65 of the blockchain 54, 64 can then use the data recorded in the blockchain 54, 64 to calculate 'trust scores' 57, 67 based on the accuracy or precision of the data produced by the ecosystem participants. Such scores can influence buying decisions, credit ratings, may be used to remove participants from the network, etc.

There is a transitive property to the calculation of 'trust' in that the degree of trust in a validator, is based on the precision of statements of correctness made about other participants in the ecosystem. In a preferred embodiment of this invention, this transitive trust scores will also be calculated and made available to ecosystem participants.

A blockchain naturally encodes a temporal ordering (not necessarily related to clock time), and hence the evolution of the scores over time can be derived, possibly leading to a predictive capability. This can be used to detect collusion, among other things.

Tokenization of Business Reputation

According to an embodiment of the invention's supply chain marketplace system, blockchain based reputation tokens may be used to attest to a supplier or manufacturer's assessed reputation. In one aspect of the invention, the reputation tokens are tokenized with smart contracts configured using, for example, the non-fungible tokens ERC721 standard, such that they are dynamic in value and include funding capabilities. In this way, the reputation tokens can include including funding attributes, enabling their dynamic value, providing fund raising mechanisms.

RFP/RFQ Engine. Aspects of the invention's supply chain marketplace system provide a vast set of independently verified data on suppliers. The present invention includes a marketplace that can provide a distributed platform that manages request(s) for quotes (RFQ) and request(s) for proposals (RFP). For example, the invention's supply chain marketplace system may include an RFP/RFQ engine that generates and provides an interface to communicate bids on goods from the world's most ethical suppliers. Such supplier's reputation may be attested to using the inventions blockchain framework.

The inventive blockchain based supply chain network provides the unique ability to place a quote that is directed only towards suppliers that meet a certain threshold of assessed compliance standards. Each supplier can customize their virtual marketing presence on the inventive marketplace, while inherently being qualified and attested to using the metrics of the invention's supply chain marketplace system.

Only suppliers/manufactures having a threshold number of tokens, (or having a token of a certain threshold value) may be selected and alerted to the RFP/RFQ(s) transmitted from the RFP/RFQ engine in the invention's supply chain marketplace system. Such suppliers/manufactures, may only be eligible to respond to certain RFP/RFQs if they meet certain threshold criteria in terms of trustworthiness qualified by their reputation score, which may be linked to their reputation token.

The smart contracts integrated in the reputation tokens, which can be used to program which suppliers are able to respond or even see the RFP/RFQ in the invention's supply chain marketplace system. In this way, the assessed reputation token values can be used to determine which suppliers actually qualify to bid on an RFP/RFQ. In one example, for x token, a supplier may qualify to respond to a particular RFP/RFQ. If a supplier is a highly engaged supplier, its tokenized value may increase, or it may be awarded with more tokens.

In one example preferred embodiment, the reputation token blockchain system may integrate with existing inventory management systems. For instance, the invention includes a market place, with an integrated inventory management system, that issues a confidence score relative to a supplier's overall carbon footprint. In this example, if based on the metrics employed by the invention's supply chain marketplace system, an attestation to a high degree of confidence can be generated indicating that a supplier has a relatively small carbon footprint, then in turn, the inventive system may rewards that suppliers' corresponding reputation token. For example, the supplier's token may automatically be rewarded (using smart contract programing) with eligibility to bid on certain RFQ/RFPs.

In this way, if suppliers are able to prove conscious consumption with respect to their business practices, they business reputation tokens will automatically enable RFQ/RFP eligibility. As such, the invention can help cultivate an economy with ethical intention by creating a global marketplace network that rewards and brings together the most responsible suppliers and supply chain participants for the greater good.

In another example, the reputation tokens can factor token value based on a supplier's ability to achieve net zero emission, or by using attestation blockchain technology to attest whether the tools, components, and ingredients that a supplier is using to supply its products are considered to be least harmful alternative. Along these lines, the invention's supply chain marketplace system may be implemented an integrated inventory management system for suppliers that has the ability to monitor and reward suppliers that are products/services that are environmentally friendly.

The reputation token can be further configured to provide a confidence score rating indicating whether a business is using ethical practices with respect to their treatment of employees.

The reputation token can be further configured to provide a confidence score rating indicating the environmental standing of a supplier. Such a confidence score may factor in whether the business is actively engaged in conservation projects, and whether the business overall is engaged in environmentally friendly practices.

Using Sustainability Metrics for Financing within Supply Chains

According to an aspect of the invention, the inventive blockchain based supply chain network may be configured to gather and evaluate metrics from a supply chain with the goal of allowing a supplier of credit to evaluate the credit worthiness of a supplier. In this case, 'credit worthiness' would preferably not only include the direct ability of the supplier to repay the loan, but also to determine if the supplier meets performance metrics, such as sustainability goals and adherence to globally-recognized sustainability standard such as the United Nations Sustainable Development Goals, as part of the evaluation criteria. The assessed value of suppliers' reputation token(s) may be considered as part of this process. The focus of this aspect of the invention is on collection and application of metrics and application in a broader evaluation of 'worthiness'.

By way of background, in current supply chain financing systems, credit is typically based on business metrics, such as cashflow or profitability. Increasingly, financing agencies are seeing a need to integrate non-traditional metrics, such as sustainability, environmental impact, social impact, and governance scores. In current supply chains, such metrics are difficult to collect and evaluate accurately, and are seldom integrated into the larger supply chain financing decisions.

Figure 7:
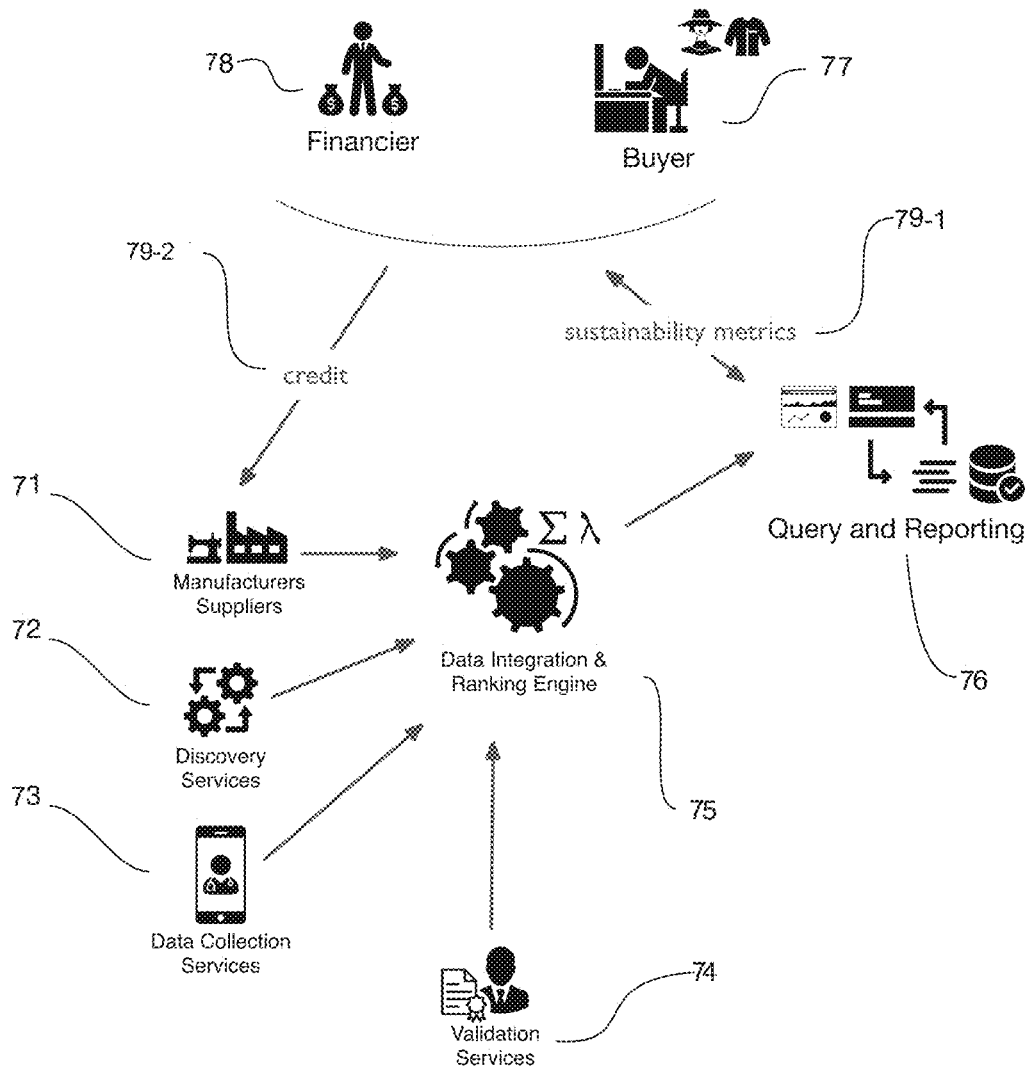
FIGS. 7 and 8 show examples of a system for sustainability evaluation as part of financing.
Figure 8:
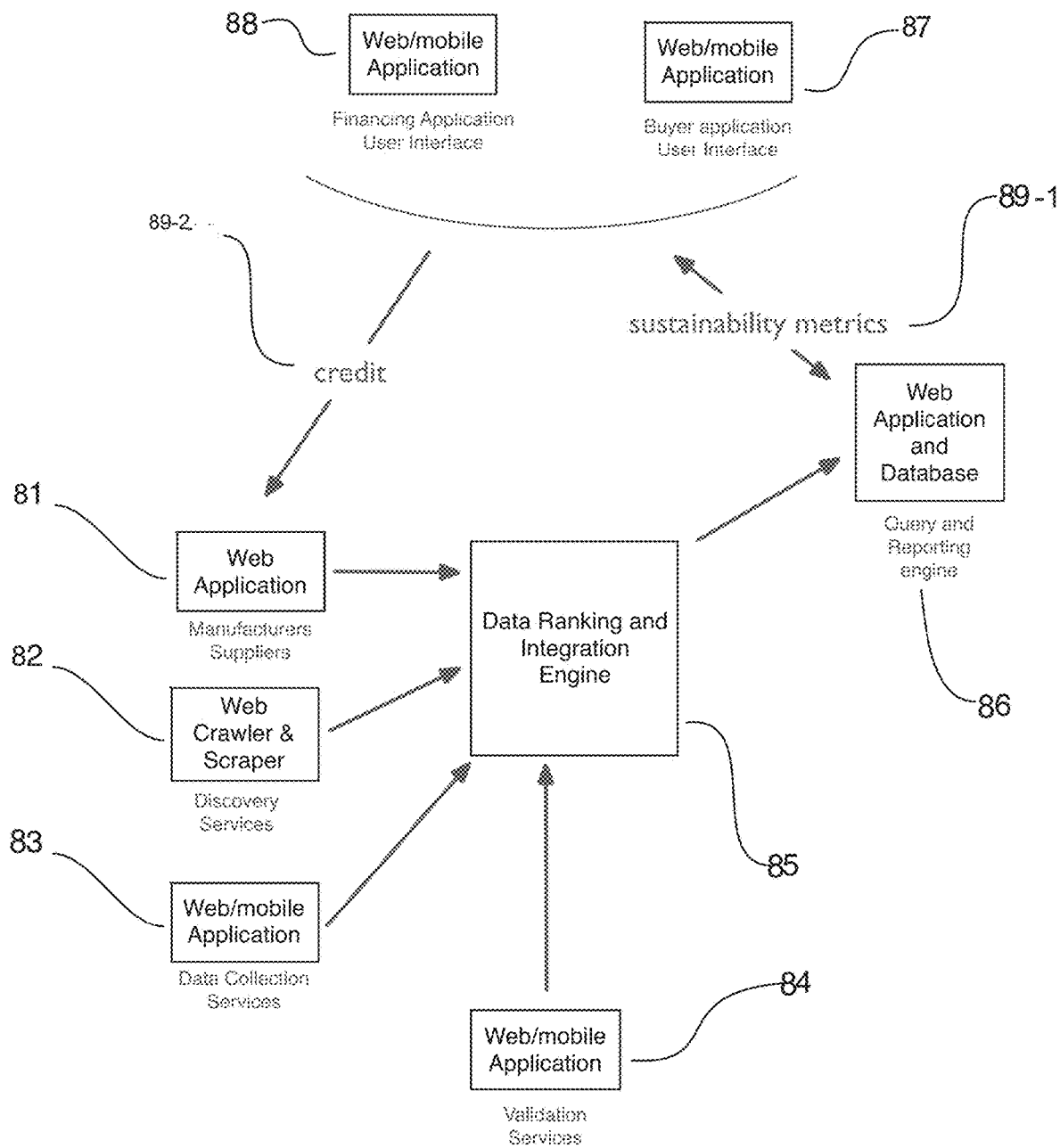

This aspect of the invention solves these problems by providing a supply chain/market place system where a) metrics are collected accurately, b) the metrics are integrated to create one or more non-traditional business metric scores, and c) such scores are integrated into the supply chain financing decisions. For example, aspects of the invention provide ESG tracking at the company level, and helps ESG investors make investment decisions based on inventive upstream and downstream data and engagement indicators. Examples implementation of this system for sustainability evaluation as part of financing is shown in FIGS. 7 and 8.

In the scope of this invention, data is collected from manufacturers and suppliers 71, 81 discovery services 72, 82 which will access a plurality of online data sources, both private and public on a periodic basis, data collection services which provide a means for in-field data collection by independent agents, validation services 74, 84 which provide a means for independent entities to attest to the correctness or incorrectness of collected data and derivatives thereof. Such data are then aggregated and evaluated within the data integration and ranking engine 75, 85 which will execute a plurality of models in order to derive non-traditional business metrics, such as environmental impact, labor law compliance, etc. Such metrics are then made available via a query and reporting engine. Buyers 77, 87 and Financiers 78, 88 will access the sustainability metrics 79, 89 via the query and reporting engine 76, 86 and then use those metrics in evaluating how much credit 79-2, 89-2 to issue to manufacturers and suppliers 71, 81, thereby applying financial pressure on the supply chain to achieve non-traditional business goals, such as environmental impact goals, or reduction in use of child labor.

It should be noted is a variant of this that could use tokenomics such that tokens represent "units of redeemable credit worthiness", which might be used to decrease interest rates, or increase the amount of issued credit. In this way, the suppliers may be issued variable credit tokens, which could be implemented, for example, with the ERC21 Ethereum standard.

Using Sustainability Metrics for Purchasing within Supply Chains

Gathering and evaluating metrics from a supply chain with the goal of allowing a buyer to make informed choices about which items to purchase and from which suppliers. This is broadly similar to the above, but would focus on the buyer, and also the application of the technology in a marketplace like the marketplace of the present invention. In this aspect of this aspect of the invention, the invention market place may be configured with supply chain purchasing systems that enable filtering/searching using 'dynamic scoring' of suppliers.

The invention recognizes that some supply chain purchasing systems can be limited because buying decisions are typically based on price, quality, etc. However, aspects of the present invention augment and expand the scope this process by integrating non-traditional metrics, such as sustainability, environmental impact, social impact, and governance scores into the purchasing process. This not only can provide benefits for branding for suppliers, but may also influence how credit or financing are extended.

Certain embodiments of invention address the limitations of supply chain purchasing system where such metrics are difficult to collect and evaluate accurately, and are not integrated into purchasing decisions in an objective manner. Thus, aspects of the invention solve these problems by providing a system whereby a) metrics are collected accurately, b) the metrics are integrated to create one or more non-traditional business metric scores, and c) such scores are integrated into the supply chain purchasing decisions.

Figure 9:
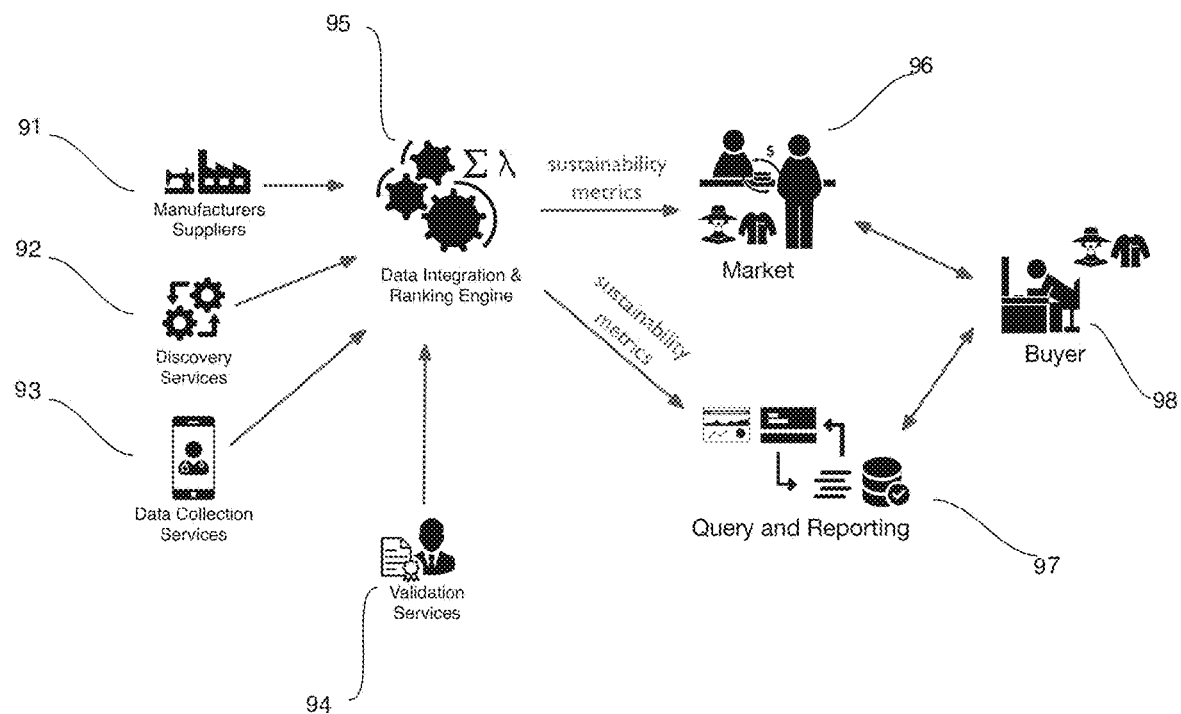
FIGS. 9 and 10 show example implementations of a system for purchasing based on sustainability metrics.
Figure 10:
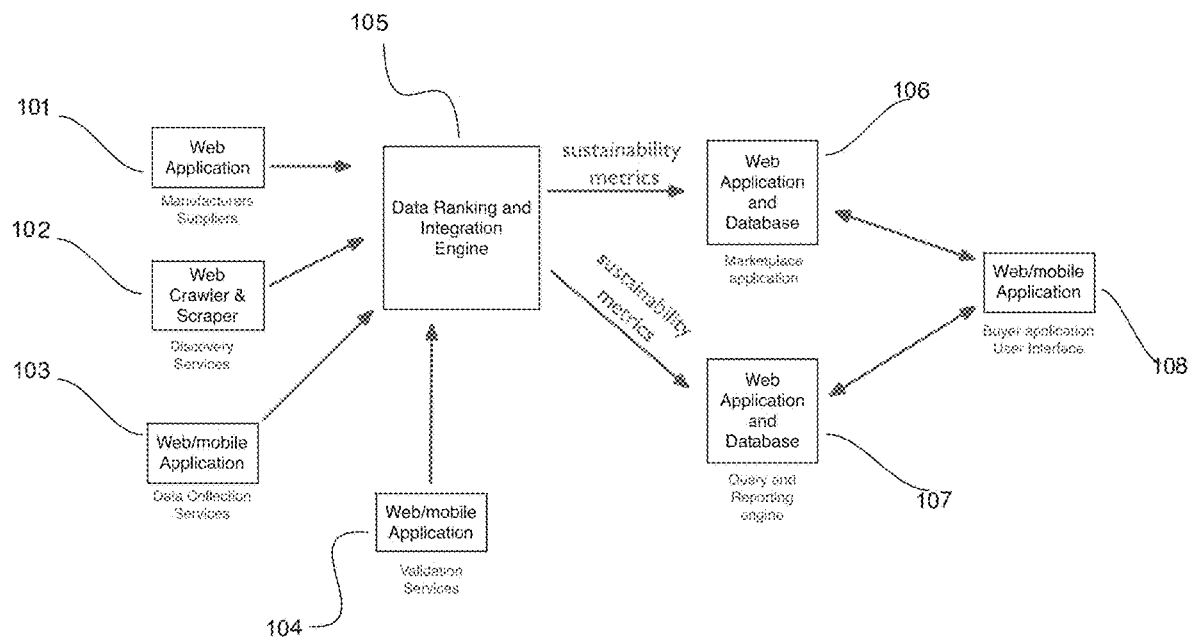

An example implementation of the system for purchasing based on sustainability metrics is shown in FIGS. 9 and 10.

In the scope of this aspect of invention shown in FIGS. 9 and 10, data is collected from manufacturers and suppliers 91, 101, discovery services 92, 102 which will access a plurality of online data sources, both private and public on a periodic basis, data collection services 93, 103 which provide a means for in-field data collection by independent agents, validation services 94, 104 which provide a means for independent entities to attest to the correctness or incorrectness of collected data and derivatives thereof. Such data are then aggregated and evaluated within the data integration and ranking engine 95, 105 which will execute a plurality of models on order to accurately generate sustainability metrics, then providing the metrics to a market 96, 106 augmented with the ability to expose the metrics as part of the buying process, and to a generic query and reporting engine 97, 107. Buyers 98, 108 will access the market 96, 106 or the query and reporting engine 97, 107 as part of the buying process and use the provided metrics to decide whether the profile of the goods is within their buying parameters.

It should be noted that in this embodiment, a token implementation may be used to evaluate metrics of a supplier. For instance, tokens may be issued or configured based on a rate proportional to the evaluated metrics of a supplier. Tokens could be redeemed for credit, or for product placement, etc.

Apparel Sector Supplier Monitoring Tools Integrated with Reputation Scoring Algorithm The "ESG" (Environmental, Social, and Governance) tools are incorporated in embodiments of the invention. Conventional ESG tools allow investor(s) to evaluate investee companies. Generally, these tools function as a way for the investor to assess the investee across environmental, social and governance factors and thereby based in corporate policy rather than operational performance and risk/issues management.

One of the main differences between certain embodiments of the present invention and conventional ESG tools available within the industry is that the present inventive blockchain based supply chain network is user focused for design professionals, merchandisers, sourcing executives and buyers, and is focused and places emphasis on industry best practice and driving change through the inventive methodology which incorporates initiatives that meet social/labor/environmental standards that best help realize improvements in the industry.

In this way, embodiments of the invention promote transparent data which has been weighted heavily with regard to the quality of verification for the purpose of engaging agents within the fashion industry to drive change as opposed to acting as a tool to store data.

Whilst some industry initiatives do excellent work to assess risk of Modern Slavery and which Suppliers provide better, compliant labour standards and manage Environmental risks, initiatives which do not publish Transparently, create a "black-box" system, whereby buyers cannot be held to account by external parties, as to whether they influence and reward their suppliers who deliver decent labour standards for workers (with training, more orders, and ongoing business, etc).

Example integrated ESG Tools in the blockchain based supply chain network are shown in FIG. 11:

| Tool | Focus |
| --- | --- |
| Social Labor Convergence Project | Social Compliance officer |
| Sustainable Apparel Coalition | Social Compliance officer |
| Sedex | Social Compliance officer |
| Fairfactories Clearing House | Social Compliance officer |
| Ecovadis | Not Fashion sector focused |

How example features of the present invention Help Fill the Gap:

In an industry driven by the initiative of the designer/product developer/sourcing executive/buyer, it is imperative to educate them on the impact of their decisions and what it means for people and planet. As mentioned before, the current model between non-governmental organizations, initiatives, certifications and standards and fashion brand designers/buyers is silo'd. In this current practice, the important factor of designer/buyers' sourcing habits at the origination of a garment is omitted, thus unsustainable sourcing habits remain unchallenged.

Example embodiments of present invention incorporate ESG too to provide a supplier monitoring tool, which provides enhanced transparency features to support buyers/designers' assessment of suppliers—a unique differentiation intended to weave threads of change between the world of fashion and human rights.

Summary of Theory of Change: Social Impact (to be elaborated in methodology):

Certain example embodiments of the invention provide integrated Marketplace and Sustainability tools that use website crawling and indexing tools to gather independently verified data online regarding the participants of the supply chain. These tools leverage a Weighting Scoring algorithm that makes social and environmental standing assessments to computationally score each participant of the supply chain with respect to:

Robustly Assess Labour or Environmental management performance to high standards;

Have an NGO or Worker-led Social Responsibility representation model in leadership to ensure Worker Voice (through trade union, or for environmental issues, NGO or charity to represent community concerns regarding environmental impacts to water & air);

Transparently publish on Supplier effort & conditions, on the internet, open-source style; and Offer Capacity Building, in realization that "pass/fail" can be unrealistic and continuous improvement, step-by-step, engaging "beyond audit" ongoingly, can deliver verified change.

Figure 58:
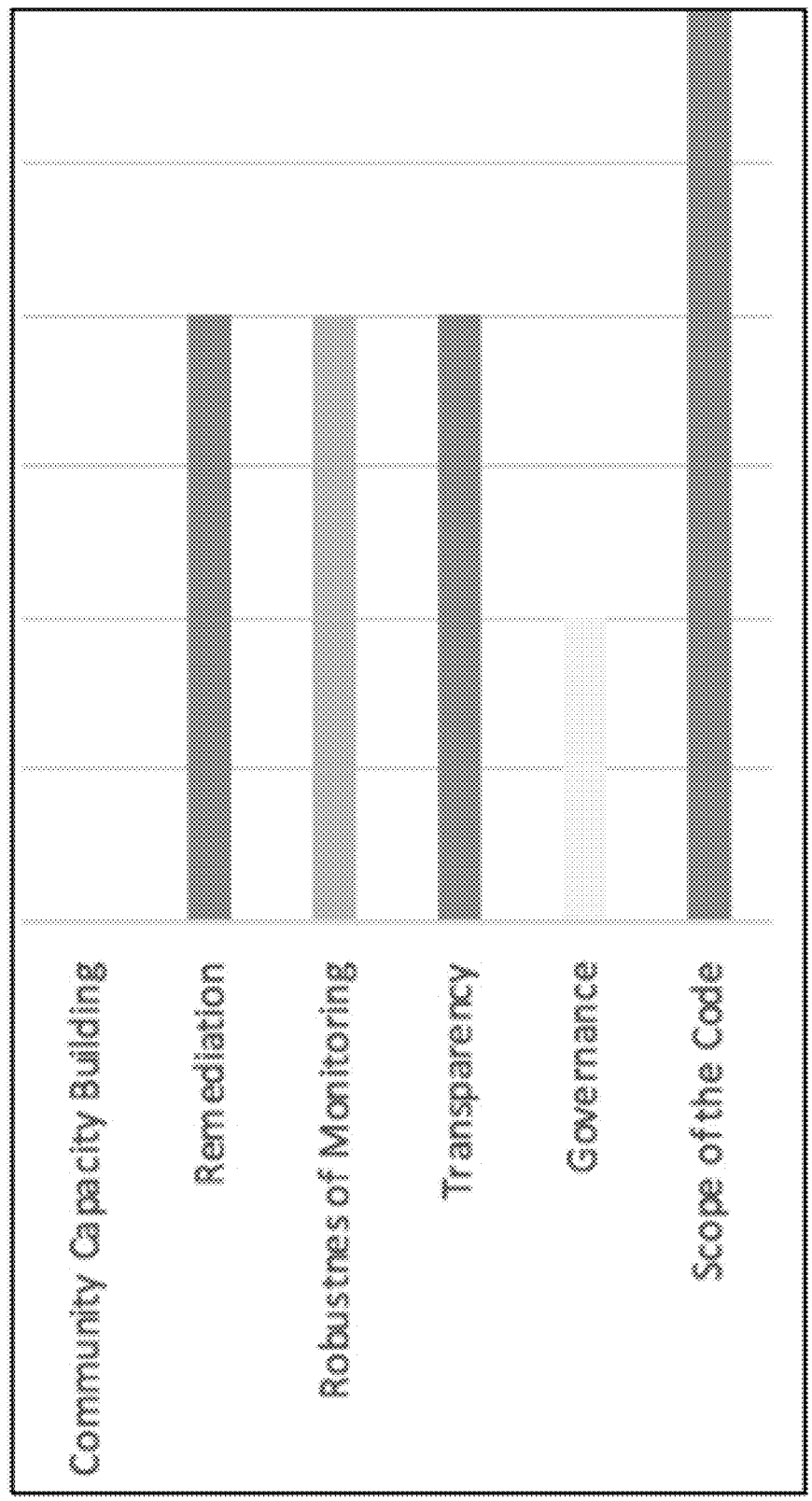

FIG. 12 shows examples of such models included in the scoring algorithm according to an embodiment. FIGS. 58 and 59 are diagrams of output of the environmental scoring algorithm according to an embodiment. The output of the environmental scoring methodology is across many example initiatives and is ranked according to their relative strength and performance across four specified criteria on aggregate.

Rating of Initiatives: to reward Suppliers "points" for participation.

Broadly, the embodiments of the environmental scoring algorithm shown in FIGS. 12, 58 and 59 assesses each initiative/standard on the overall strength of the initiative as well as the scope of the initiative and the extent to which an initiative addresses all key environmental/social impact areas.

For Labor and Social: the environmental scoring algorithm assesses standards/initiatives across six criteria: Scope of the Code, Governance, Transparency, Robustness of Monitoring, Remediation and Community Capacity Building. This methodology processes the initiative's/standards factors/scope and it's impact across all key social impact areas, and scores/grades them. The environmental scoring algorithm highlights initiaves' and suppliers' traction on additional social and labor criteria such as Living Wages explicitly based on the code of the initiative they are engaged with and also which customers the supplier produces for and which initiatives that customer is engaged with. A badge/token is coded into this supplier's profiles to indicate to users these commitments. Importantly, it is not a guarantee of living wages but is an indication of adherence.

For Environment: the environmental scoring algorithm assessment is broken down into four criteria: Water, Energy, Waste and Land (Biodiversity) and the scoring engine assess each initiative based on these criteria.

Within this framework, the inventive methodology evaluates the initiatives' scope and strength in addressing core environmental and social criteria and spotlight issues. The focus of the invention's scoring and predictive processes are based on independently verified and trusted measures, including industry learnings, like the United Nations SDGs, United Nations Global Compact, the UK Environmental Audit Committee, C&A Foundation and Fashion Revolution and others, which have outlined the key areas in which industry reform towards sustainability and transparency is crucial and what measures are necessary to meet global sustainability goals, as advocated by the UN SDGs.

In the certain embodiments, Suppliers are provided ratings based on their Social and Environmental efforts as indicated by their performance in publicly reporting initiatives.

Figure 13:
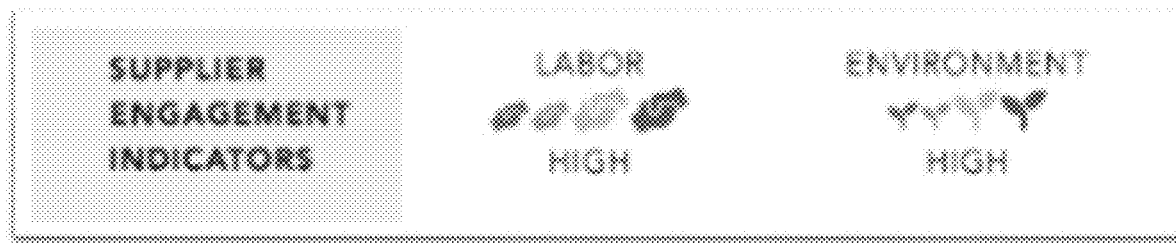
FIG. 13 shows example points awarded toward a Suppliers Social/Labour and Environmental engagement ranking considered as part of the scoring engine.

FIG. 13 shows example points awarded toward a Suppliers Social/Labour and Environmental ranking present.

To computationally calculate metrics with trust scores for each supply chain participant, the inventive system makes decision(s) on allocation of "points" for initiatives associated with the supply chain participant:

The selection of Initiatives to feature includes independently verified data from third parties about the respective supply chain participants, such data includes:

1. Input from experienced Fashion Sustainability and Labour standards Advisors, and
2. Input from outreach to Brand buyer Corporate Responsibility and Sustainability leaders, in companies ranked by initiatives such as KnowTheChain, Fashion Revolution, IPE GCA and Corporate Human Rights Benchmark for better Labour and Environmental investment and efforts; and
3. Input from Outreach to leaders of initiatives, including NGO/charities who research and advocate how business should better drive supply chain factory labour and environmental standards improvement.

Points will be allocated to Suppliers (and/or other participants of the supply chain):
- based on which initiatives and certifications they are members of, and
- inline with weighting of initiatives based on the expert review process described above.

Stakeholder Engine

Aspects of the inventive system may include a stakeholder engine. The stakeholder engine includes input from independent parties regarding the participants of the supply chain, which is factored in as part of the scoring engine, including data from:

This could include the relevant individuals from:
1. Human Rights Watch, (Aruna Kashnap), advocating on Fashion supply chain labour standards;
2. Intl Trade Union Congress (ITUC), (Stephen Russell) advocates Fashion labour standards;
3. Freedom Fund, supply chain Modern Slavery experts
4. Economic Rights Institute, China Asia, (Dimitri Kessler) former Ethical Trading Initiative China
5. Intl Corporate Accountability Roundtable
6. Greenpeace (whilst involved in Leather Workgroup & Detox, is as critics)
7. OECD, Jennifer or Tyler, led development of Apparel, Footwear Responsible Business Guidelines
8. Experienced Independent Experts such as Mr Rishi Singh, India, former SAI India The Alliance for Bangladesh Worker Safety was brand led, assessed Safety and published transparently;

The Bangladesh Accord also assessed Safety, but was more robust as Brands were held to account to Purchasing Practice commitments, and published transparently;

Some certifications do not have as robust joint monitoring and transparency;

Other Initiatives such as "YESS" (Yarn Ethically and Sustainably Sourced") are currently at a stage for merely tracking Suppliers stating their Commitment to the Principles (with no site level verification yet), AND are focused on issues (in YESS, in yarn spinners, mills and cotton sourcing).

Social/Labour Standards monitoring Initiatives Currently Included as factors for the scoring engine, are shown in FIGS. 14 and 15, as well as below.

For example, of initiatives included in the invention assessment for reputation scoring (e.g. trust score), suppliers who are members of the following are awarded points as they are seen to be making an effort to address labour issues:

| Initiatives which Indicate Social, Labour standards effort, and to tackle Modern Slavery: | |
|---|---|
| Fair Labour Association FLA accredited company | Positive pts for Supplier membership |
| Fair Trade: | Positive points for participation |
| Fairwear | Positive points for participation |
| ILO Better Work Participating factories | Positive points for participation if in scope |

| | |
|---|---|
| ILO Better Work Transparency Database | Minus points if non-compliance published |
| ILO SCORE participant n past 2 years | Positive points for participation if in scope (less as results not published) |
| SA8000 | Positive points for participation if in scope (less as results not published) |
| Bangladesh Accord on Fire & Building safety | Positive points for participation if in scope (more points than Alliance as more robust), Minus pts if non-compliance published |
| Bangladesh Accord Remediated Suppliers | Highest pts, less for critical non-compliance |
| Bangladesh Alliance on Fire & Building Safety | Positive points for participation if in scope (less points than Alliance as less robust), Minus pts if non-compliance published |
| Factories transferred to Bangladesh Government Safety inspection program | Less than Alliance and Accord, but few pts as shows a supplier has been inspected and reports are publicly available. |
| YESS Yarn Ethical and Sustainably Sourced | Few pts for commitment |

Initiatives which offer NGO-run Worker Hotlines:

Handshake Worker Hotline (China, India)
Unseen Modern Slavery Hotline UK
LaborVoices
Quizzr Tackle Modern Slavery:

Stronger Together Clear Voice
FairHiring (Worker Agencies are accredited)
IOM Programme Support Women Worker/Gender Rights:

HERProject participant (within past 2 years)
Women in factories Project Participant
CARE PACE Programme Environmental Initiatives are considered as part of the scoring engine:
Of initiatives factored in in the scoring engine, suppliers who are members of the following are
awarded points as they are seen to be making an effort to address environmental issues:

Initiatives which are Indicators of Environmental Efforts:

| | |
|---|---|
| Textile Exchange (organic etc) | Points for participation |
| Sustainable Apparel Coalition | Points for participation |
| Better Cotton Initiative | Points for participation |
| Leather Working Group | Points for participation Greater points for higher Grading |
| HK Sustainable Fashion Consortium | Points for participation (less as no field work) |
| ZDCH (Zero Discharge of Hazardous Chemicals) | Points for participation |
| Italian Suppliers committed to DETOX | Points for participation (less as no field work) |
| NRDC Clean By Design | Points for participation |
| Italian Sustainability, Ecology, Environment Commission | Points for participation (less as no field work) |
| Bluesign | Points for participation |
| IPE GCA | Points for participation |
| Mekong Club | Points for participation |
| Amfori BEPI/BSCI | Points for participation |

FIGS. 17-57 are example screenshots of example user interfaces to the inventive blockchain based supply chain network systems.

Digital Processing Environment

Figure 16A:
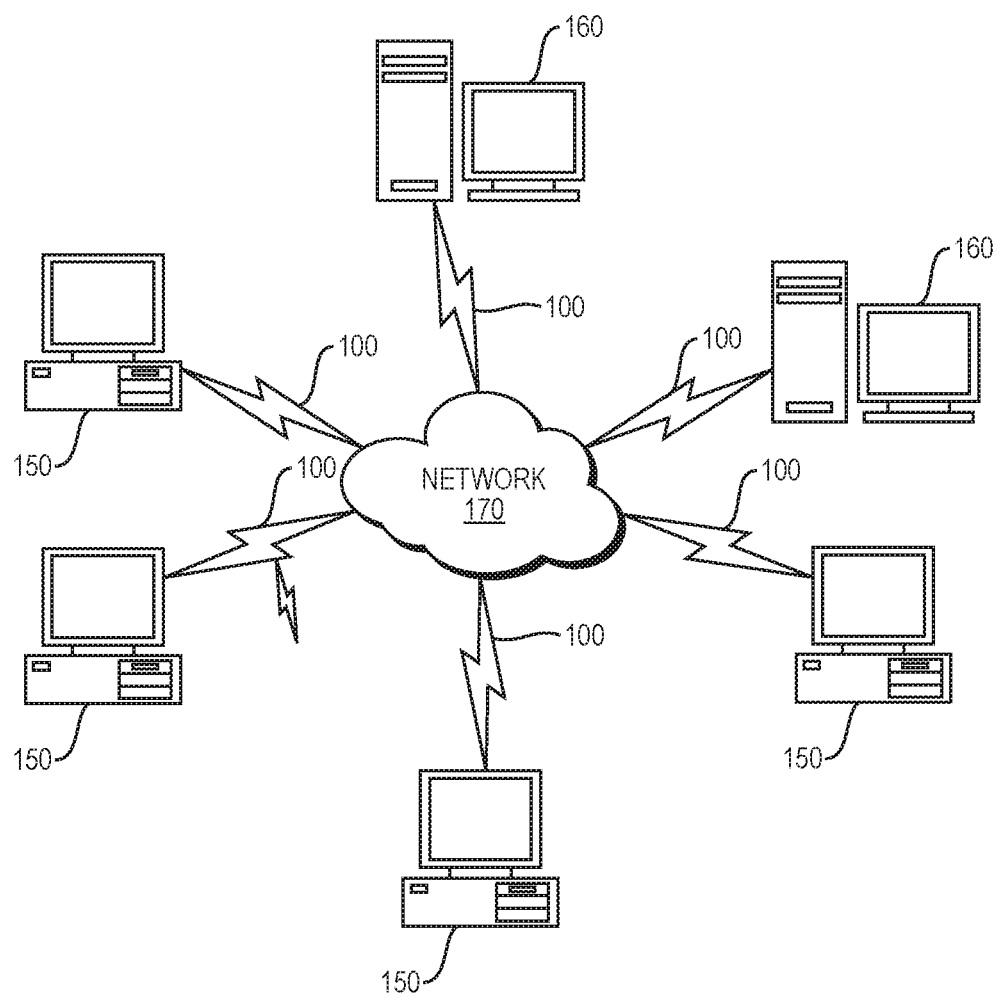
FIG. 16A is an example digital processing environment in which embodiments of the inventive blockchain based supply chain network systems may be implemented.

An example implementation of a supply chain monitoring, marketplace and blockchain system 100 according to an embodiment of the invention may be implemented in a software, firmware, or hardware environment. FIG. 16A illustrates one such example digital processing environment in which embodiments of the present invention may be implemented. Client computers/devices 150 and server computers/devices 160 (or server network 170) provide processing, storage, and input/output devices executing application programs and the like. The server computers 160 may not be separate server computers but part of a network 170.

Server computers 160 may include a server 170 of FIG. 16A, which enables a registered user (supply chain entities) to operate in the supply chain/transaction network. The communication network 170 may also include a trusted network 170 of FIG. 16A.

Client computers/devices 150 may be linked directly or through the communications network 170 to other computing devices, including other client computers/devices 150 and server computer/devices 160. The communication network 170 can be part of a wireless or wired network, remote access network, a global network (i.e. Internet), a worldwide collection of computers, local area or wide area networks, and gateways, routers, and switches that currently use a variety of protocols (e.g. TCP/IP, Bluetooth®, RTM, etc.) to communicate with one another. The communication network 170 may also be a virtual private network (VPN) or an out-of-band network or both. The communication network 170 may take a variety of forms, including, but not limited to, a data network, voice network (e.g. land-line, mobile, etc.), audio network, video network, satellite network, radio network, and pager network. Other electronic device/computer networks architectures are also suitable.

Figure 16B:
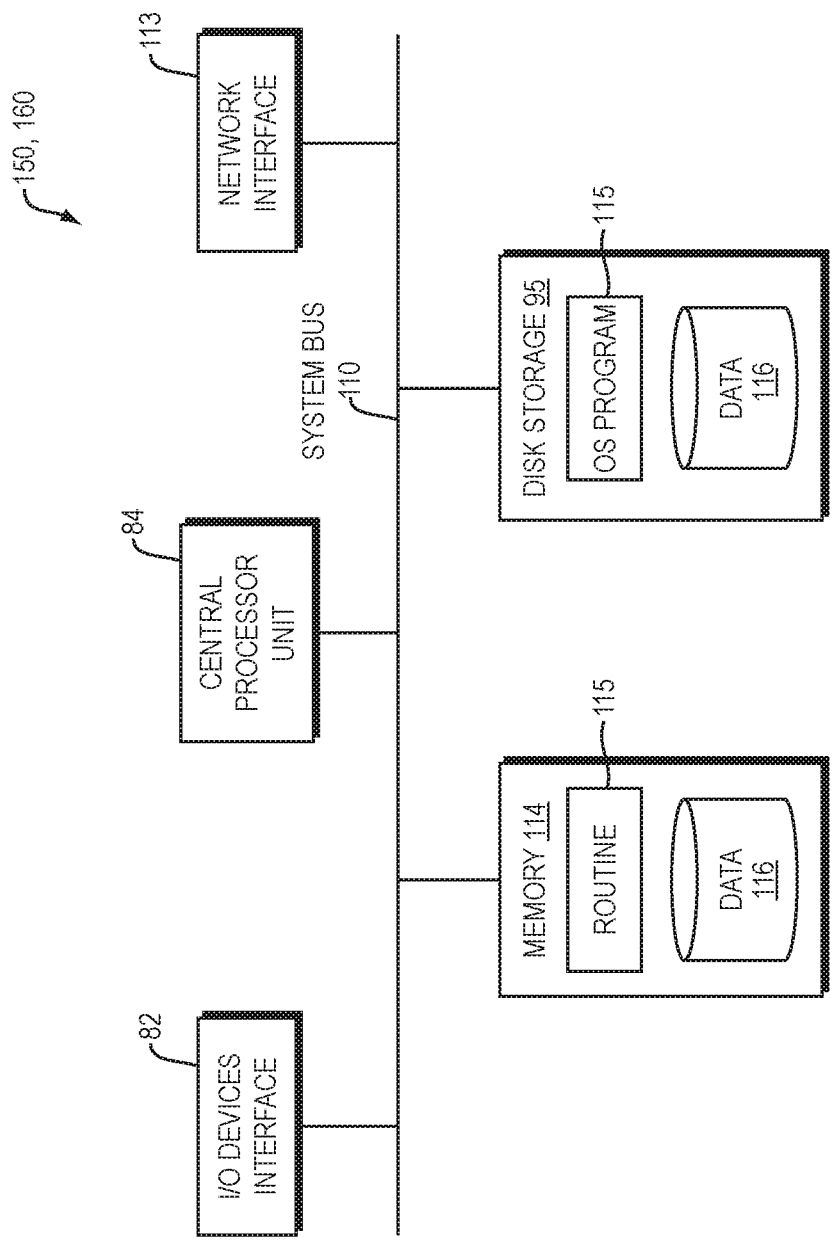
FIG. 16B is a block diagram of any internal structure of a computer/computing node.
Figure 17:
Figure 18:
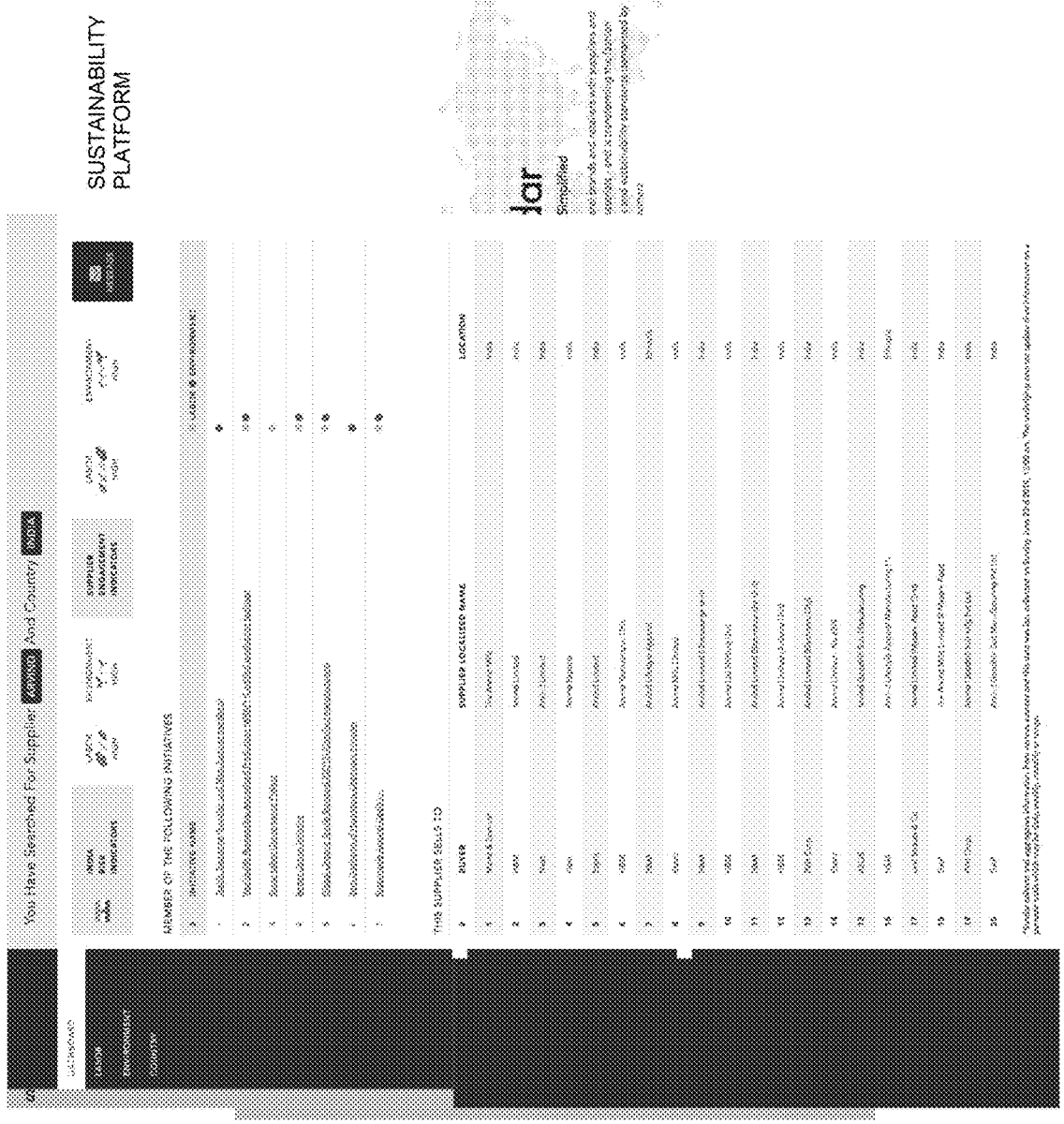
Figure 21:
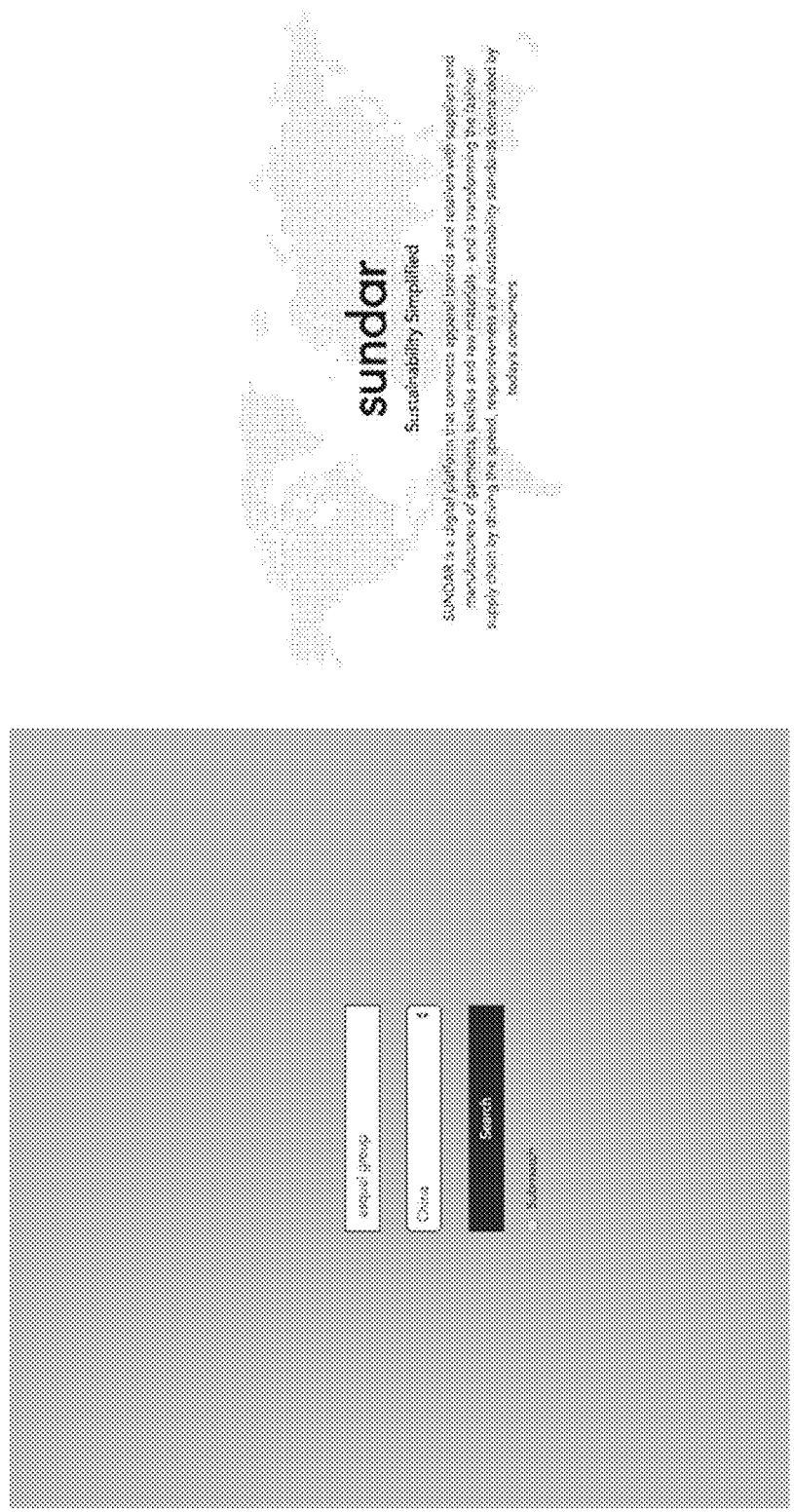
Figure 22:
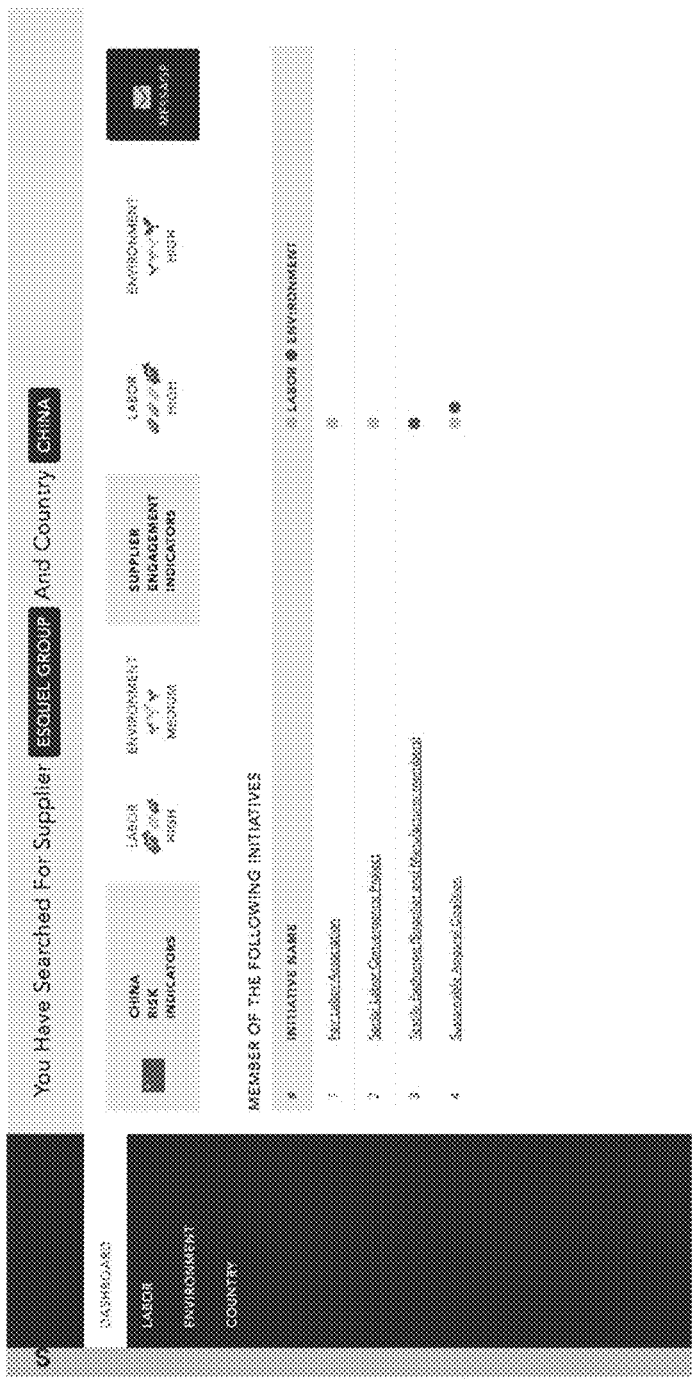
Figure 25:
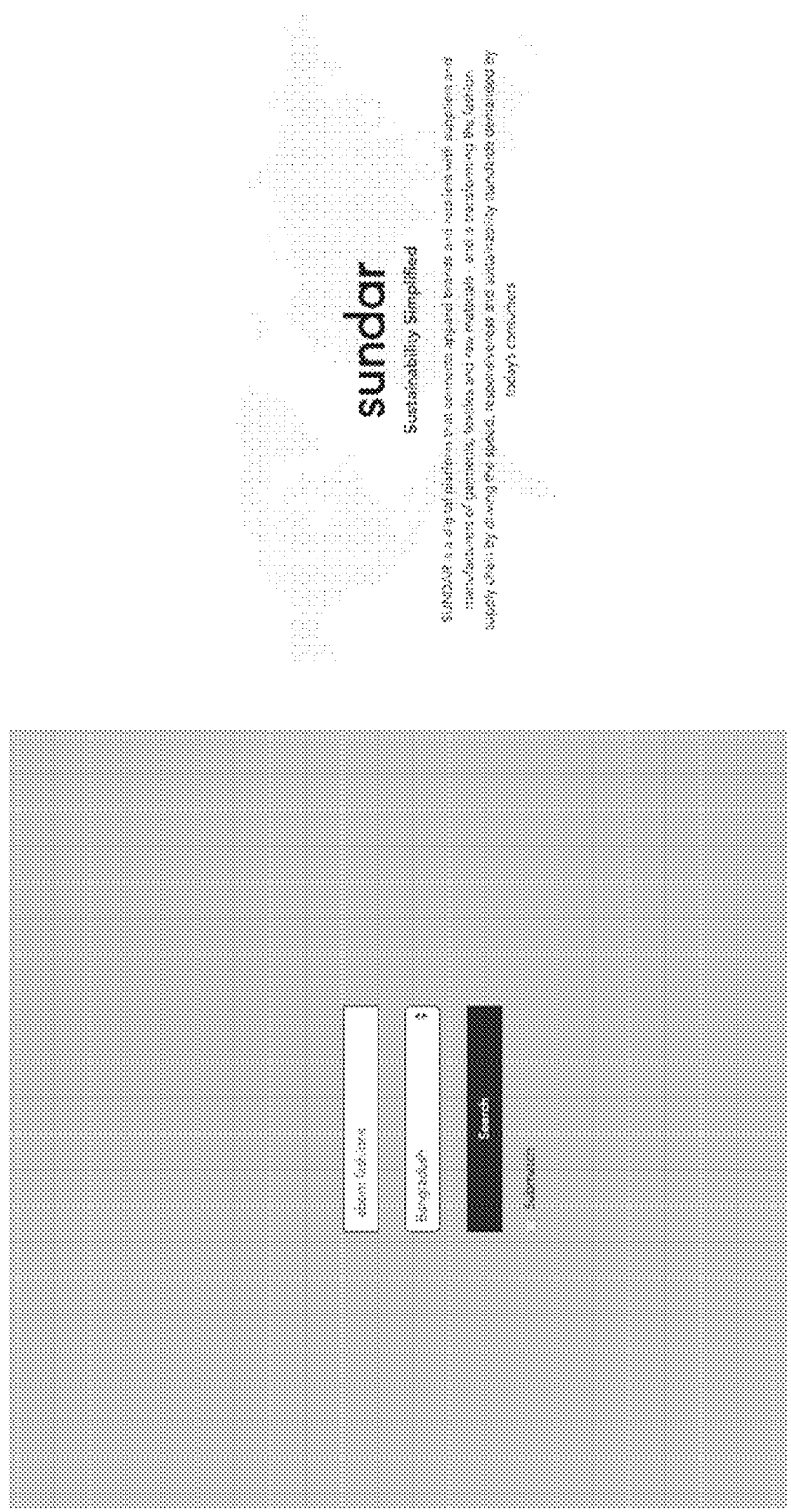
Figure 27:
Figure 29:
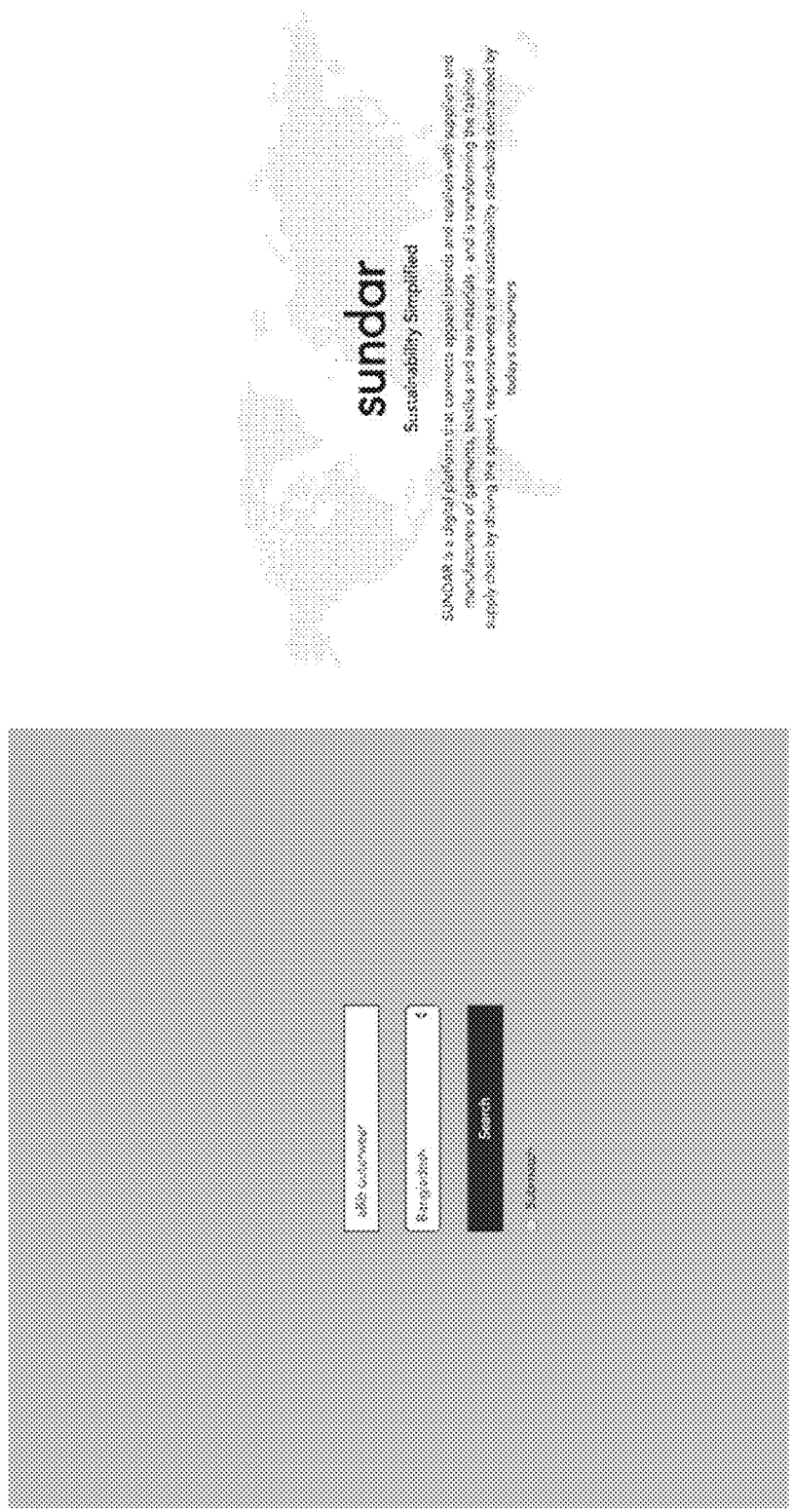
Figure 30:
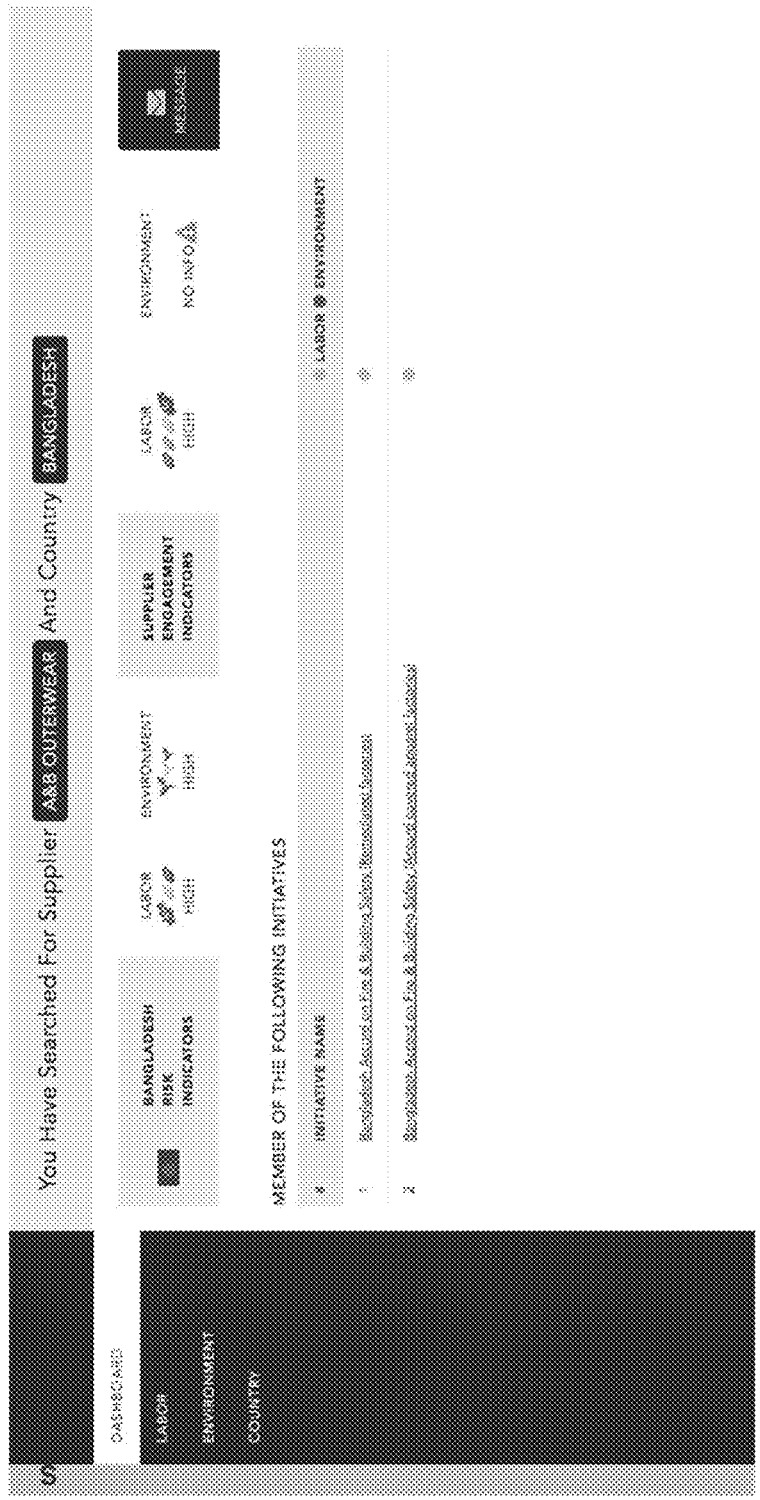
Figure 32:
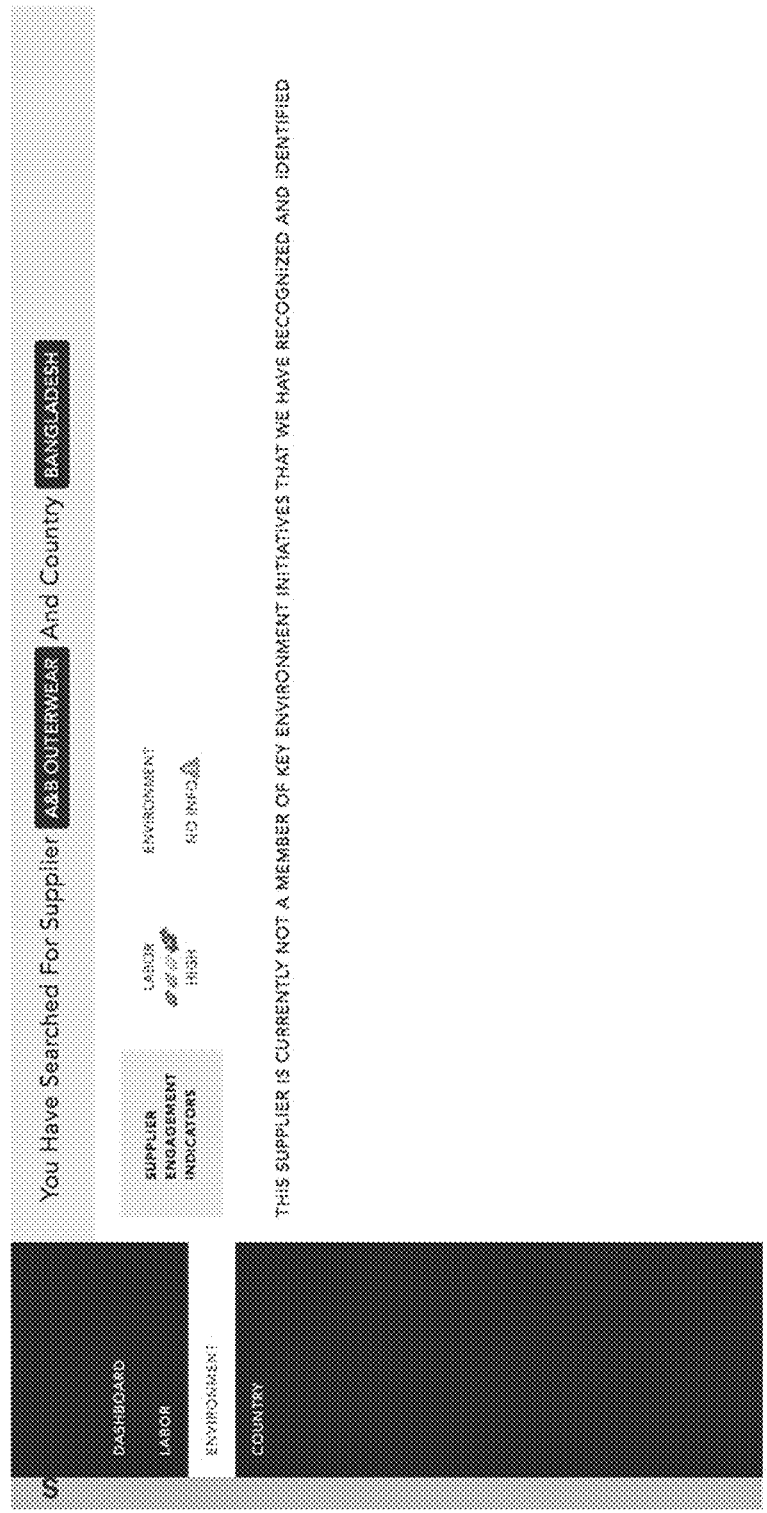
Figure 33:
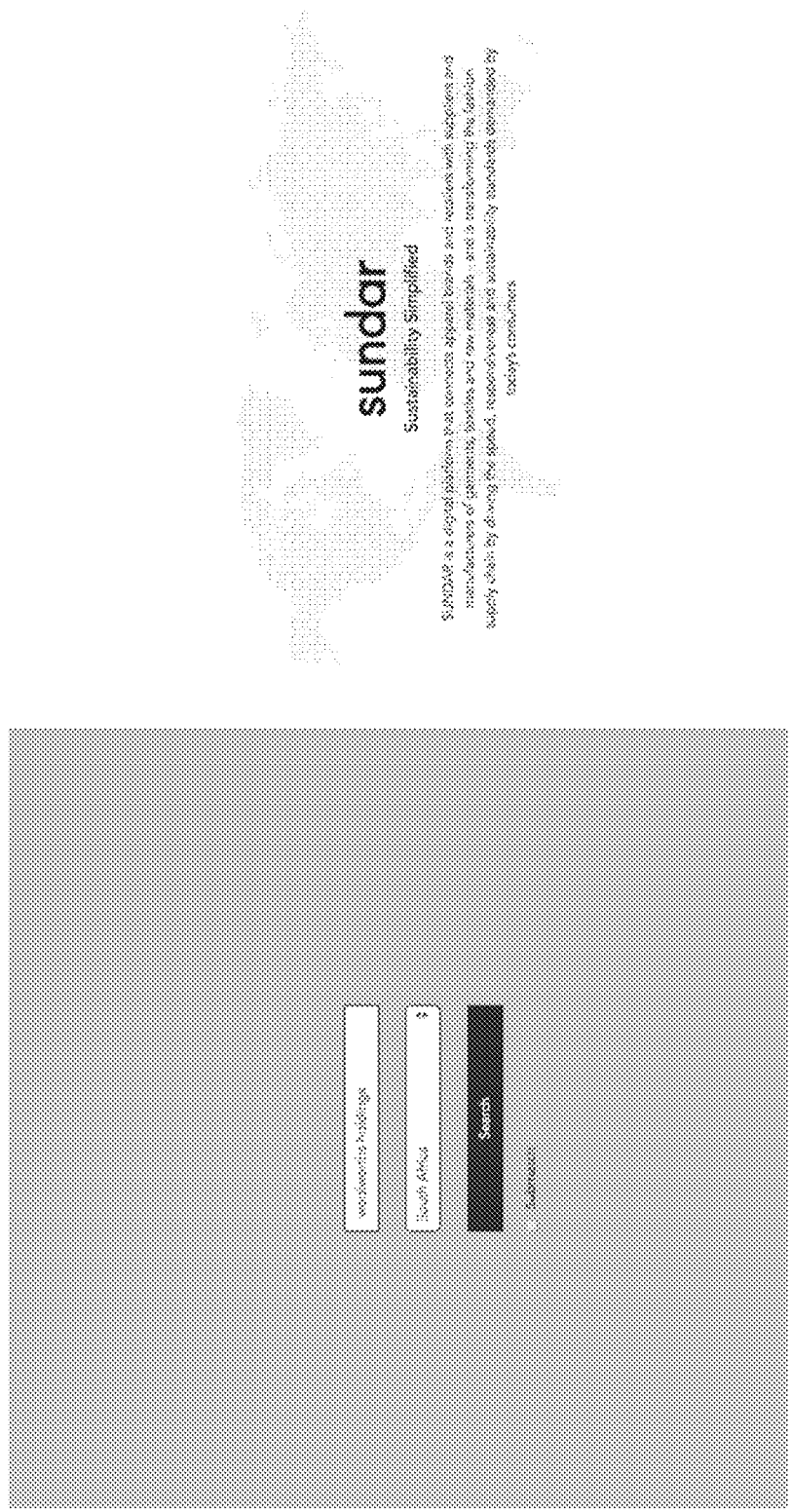
Figure 34:
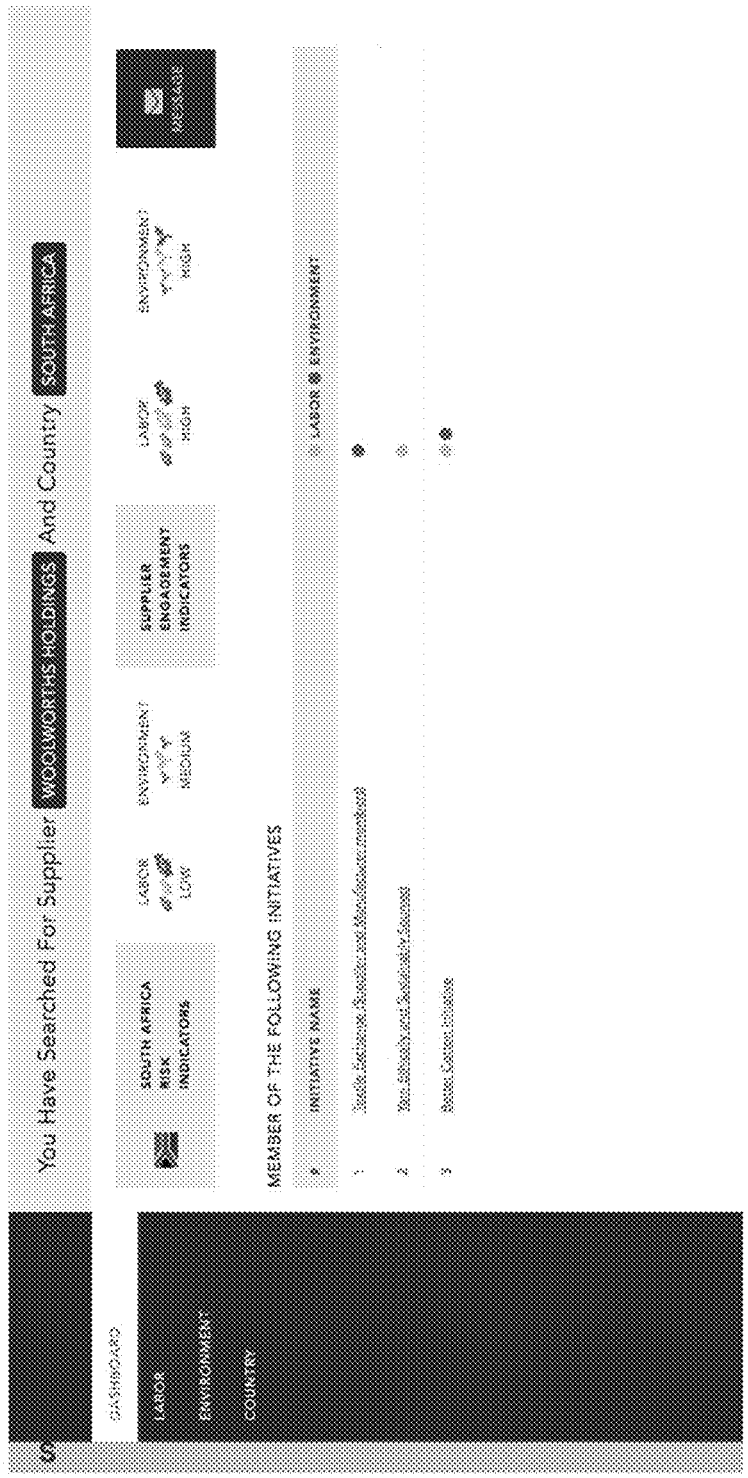
Figure 36:
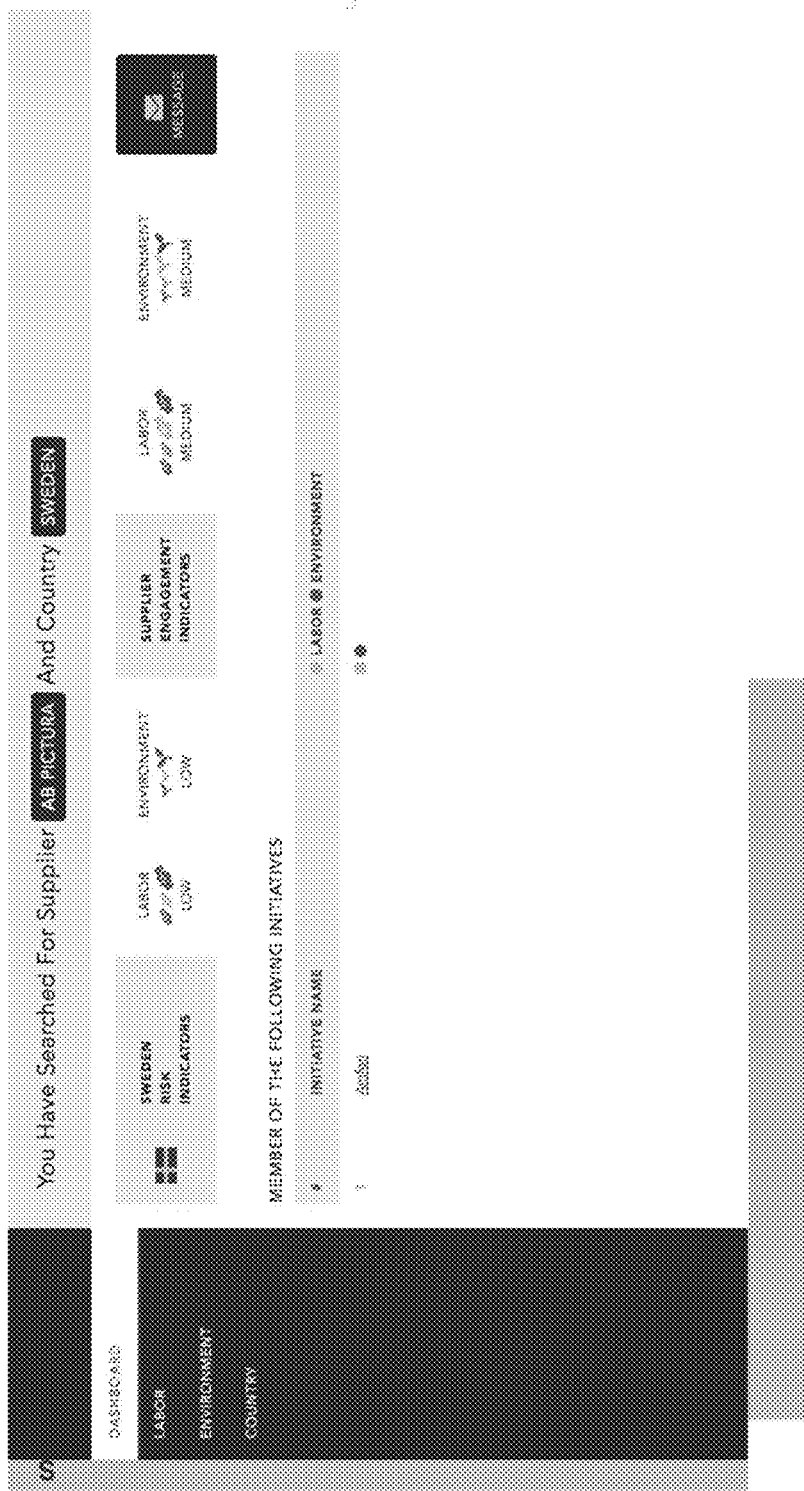
Figure 39:
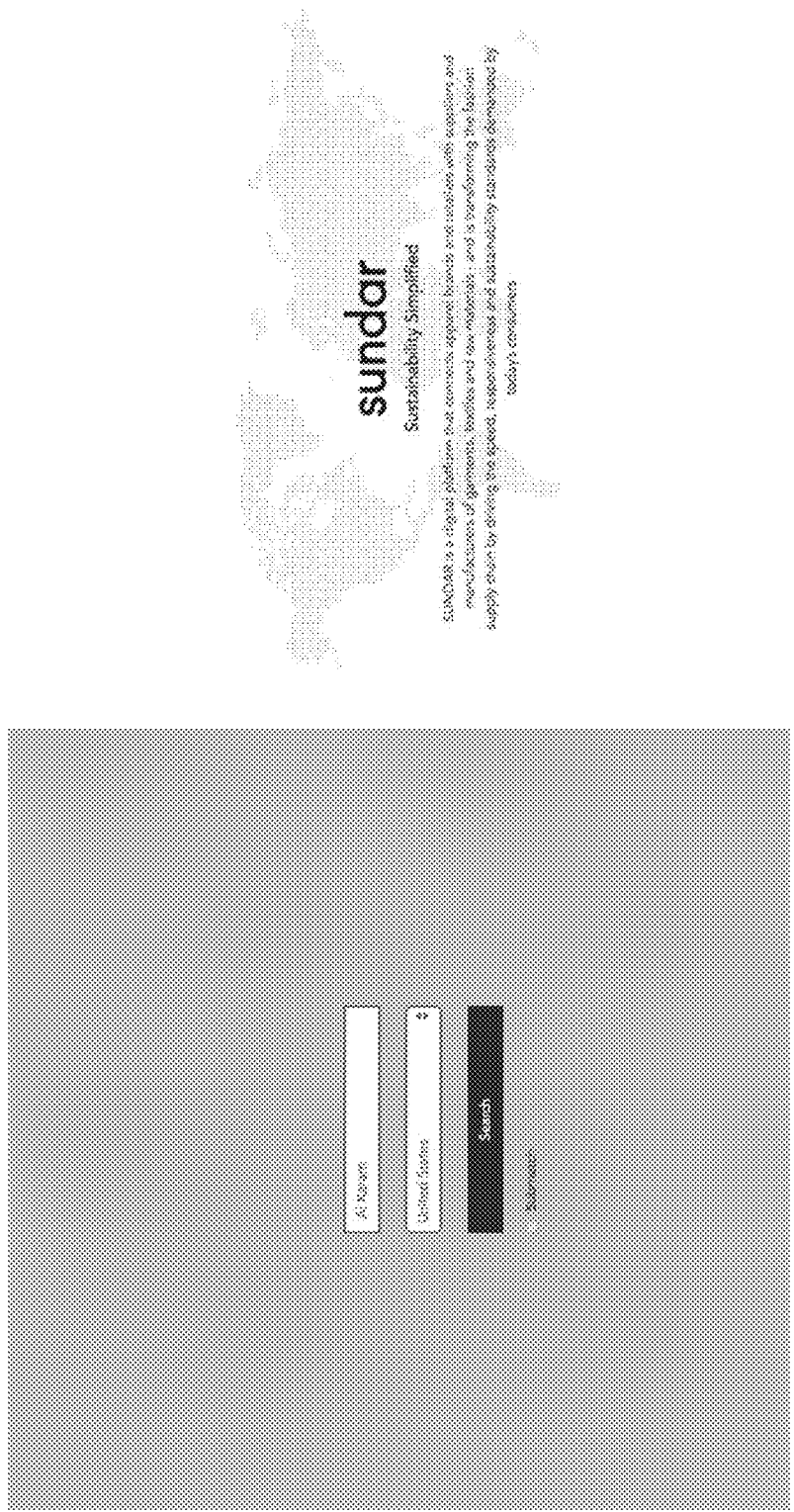
Figure 40:
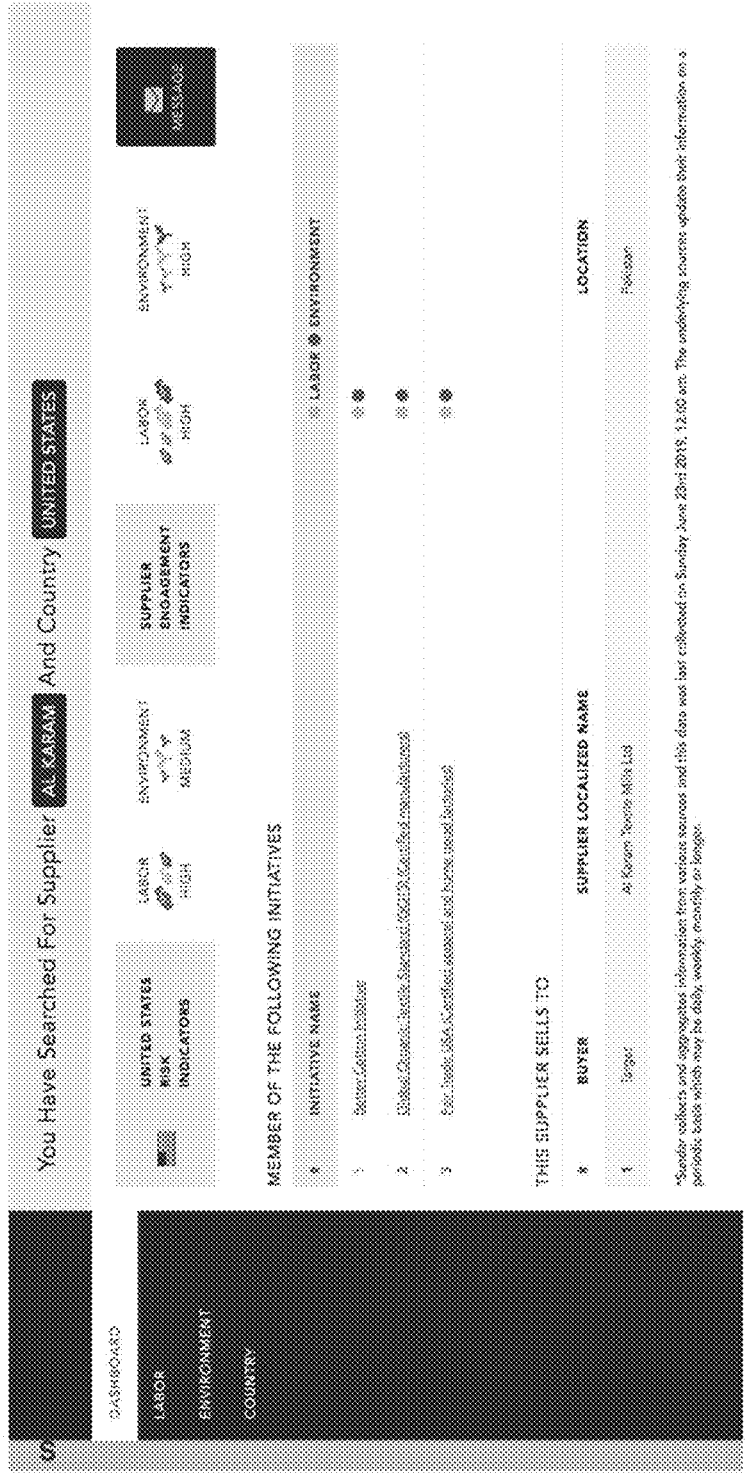
Figure 43:
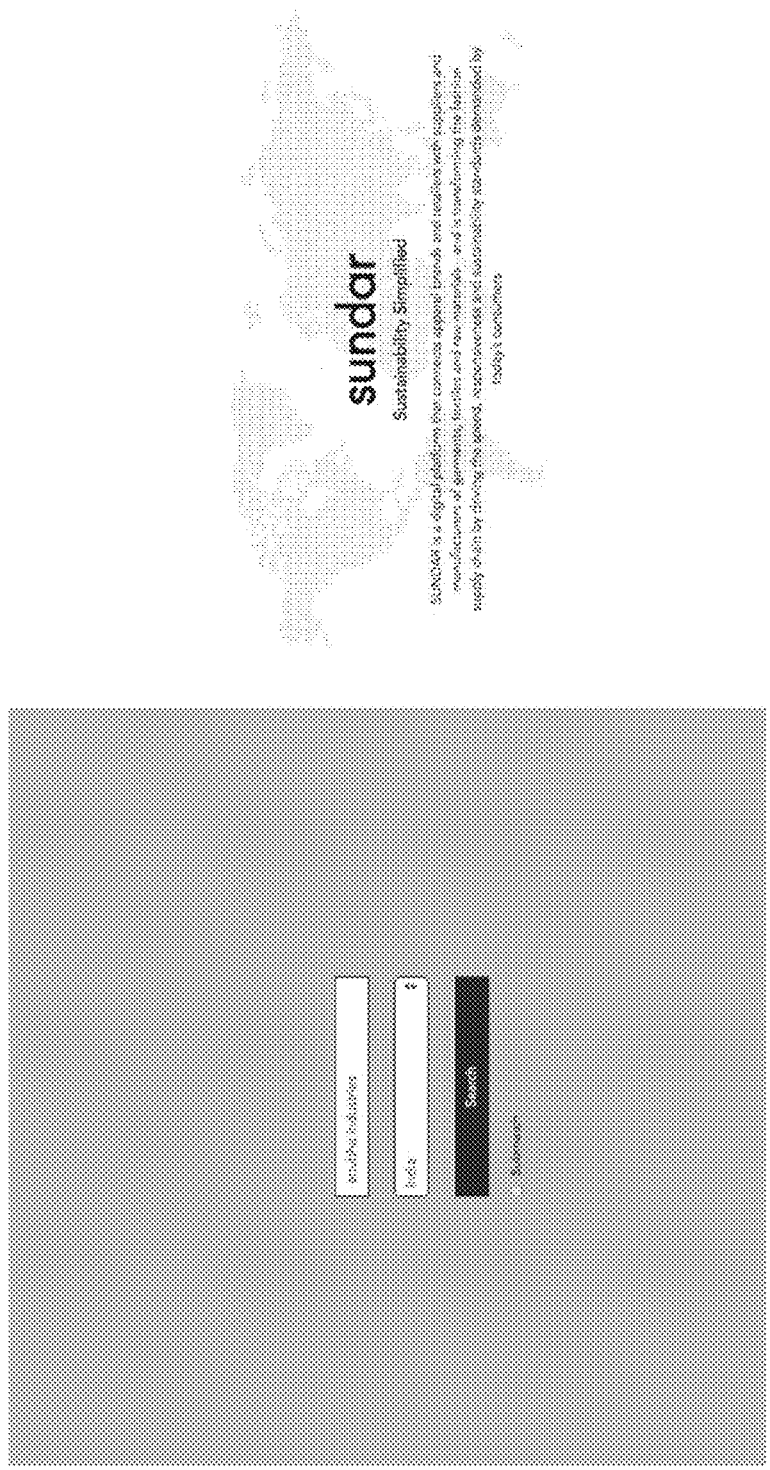
Figure 44:
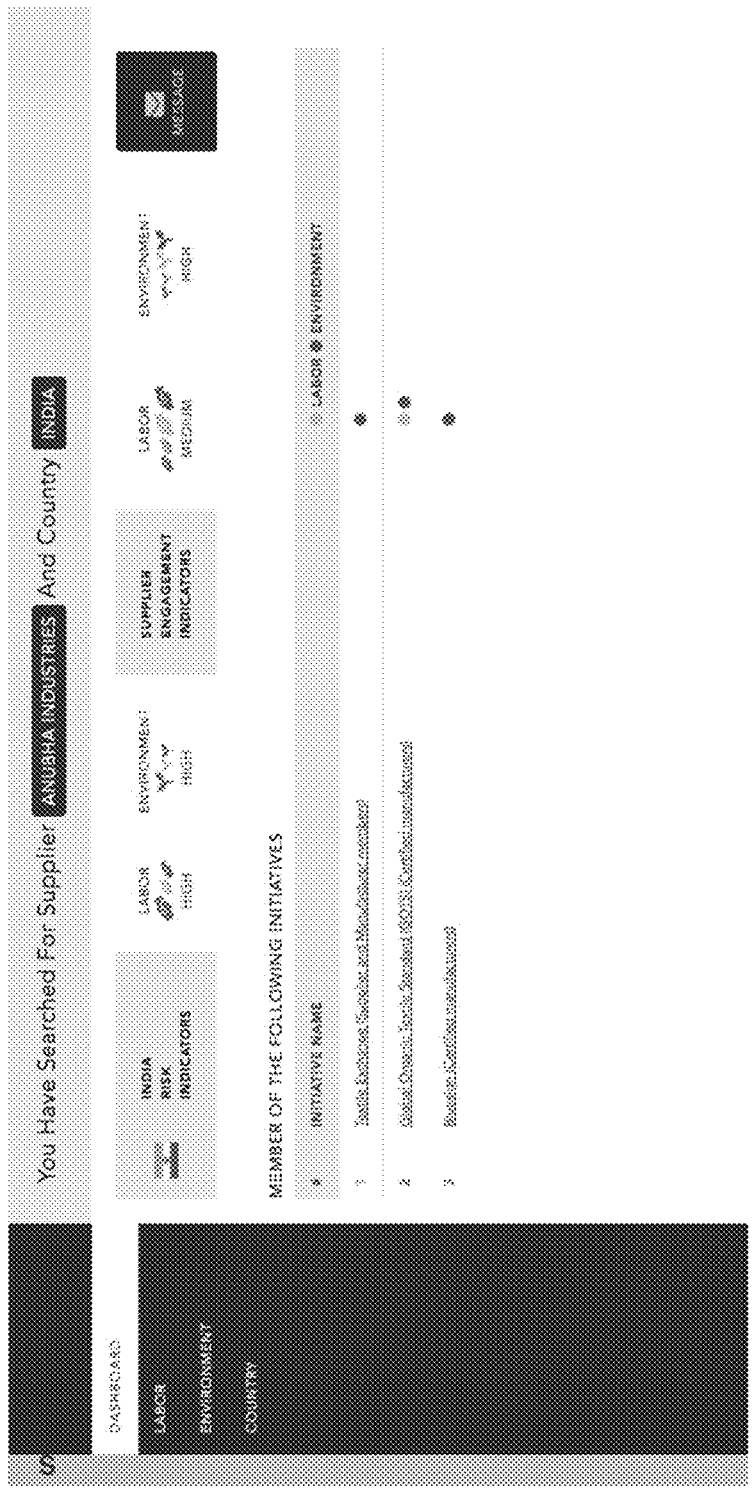
Figure 47:
Figure 48:
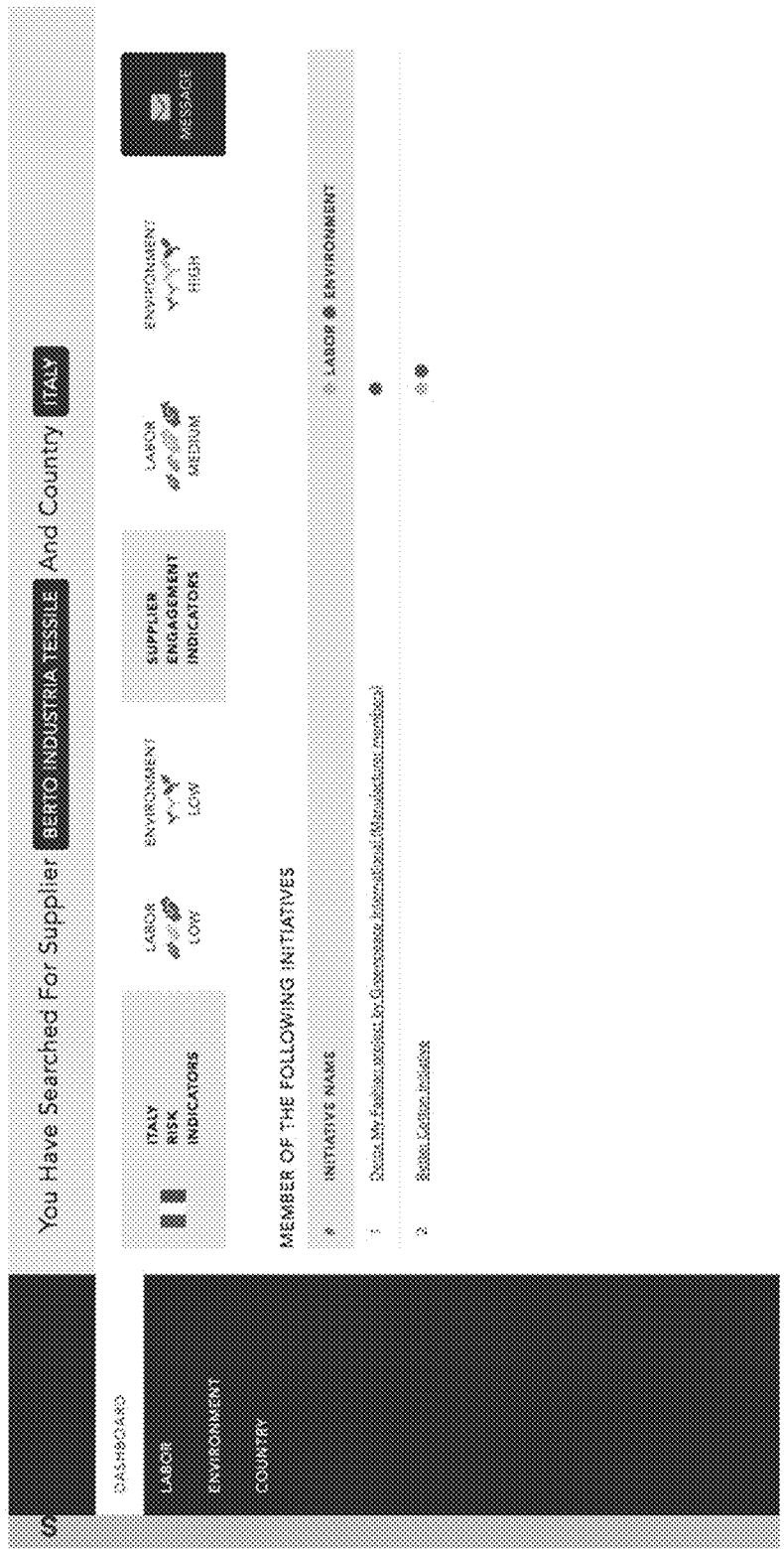
Figure 50:
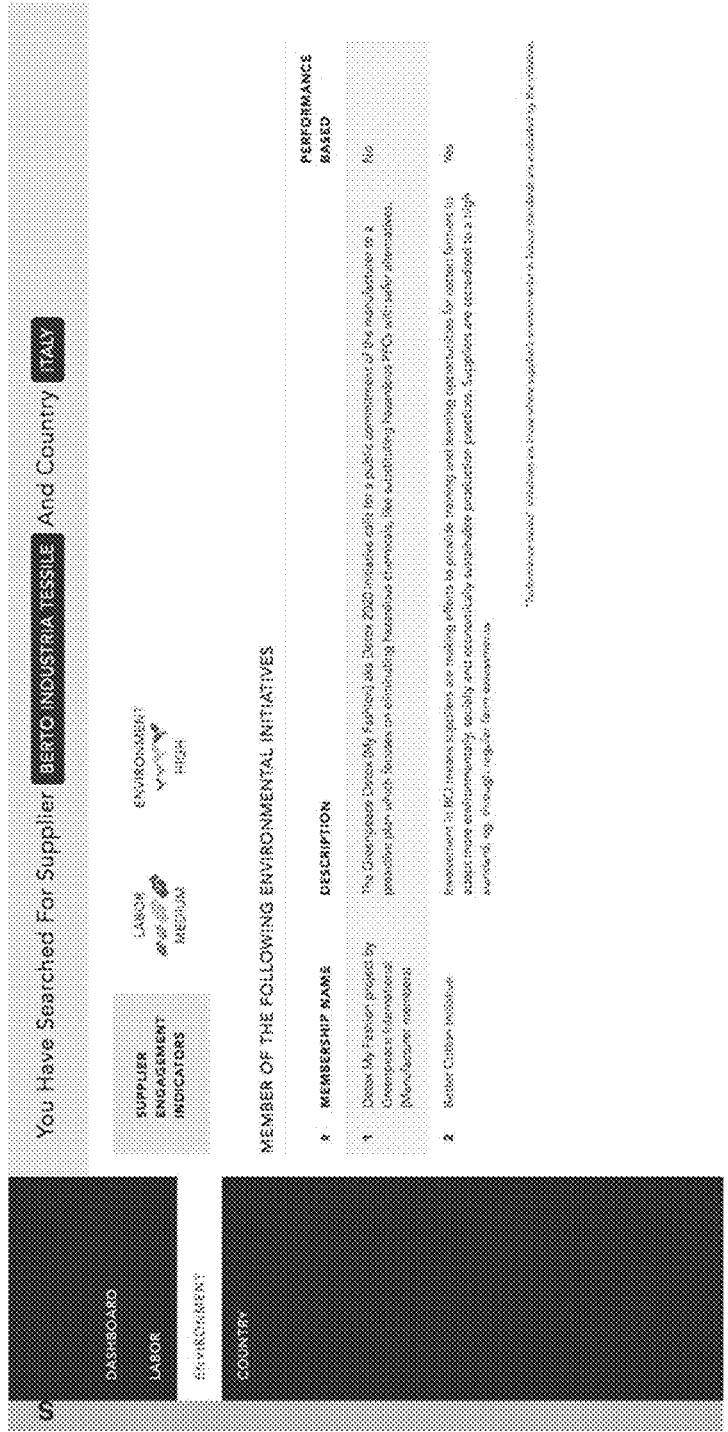
Figure 51:
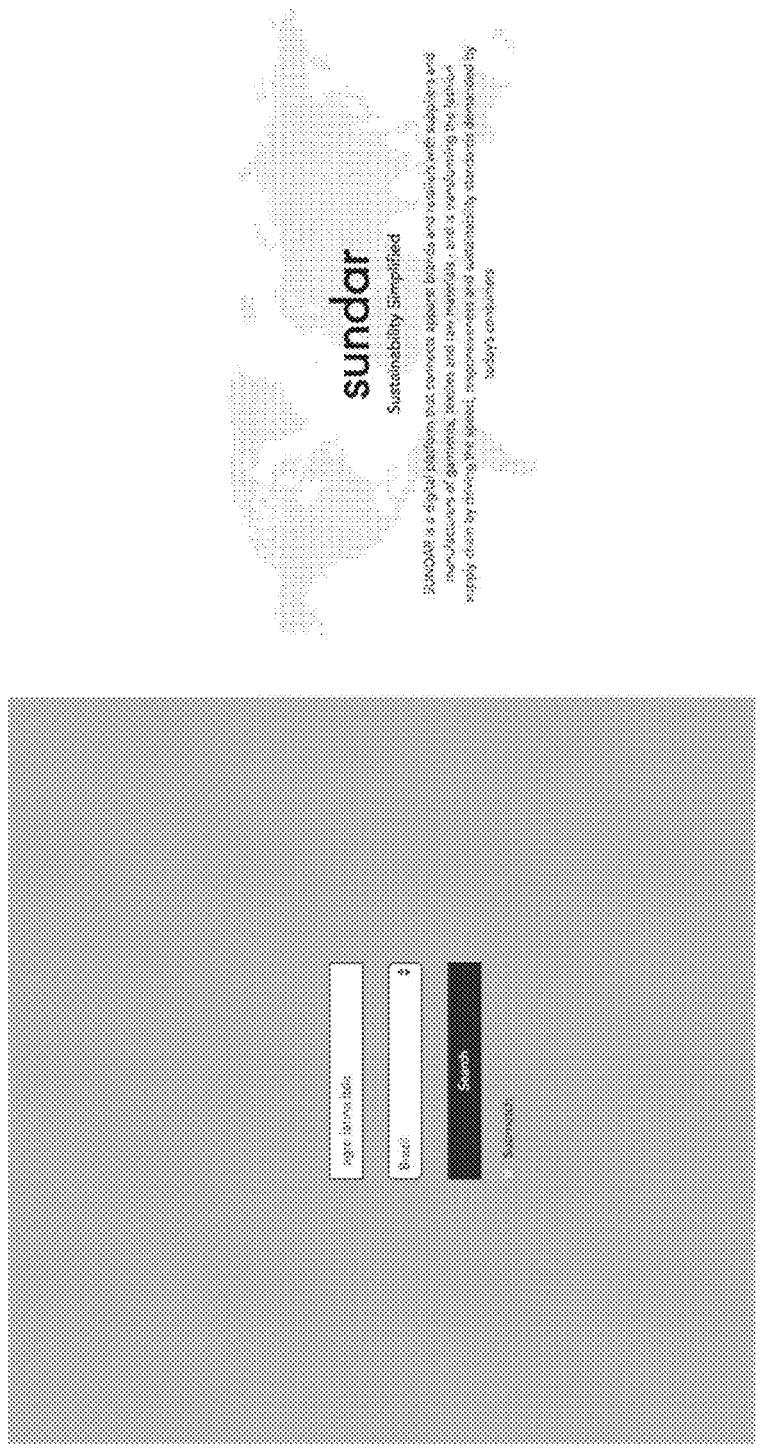
Figure 52:
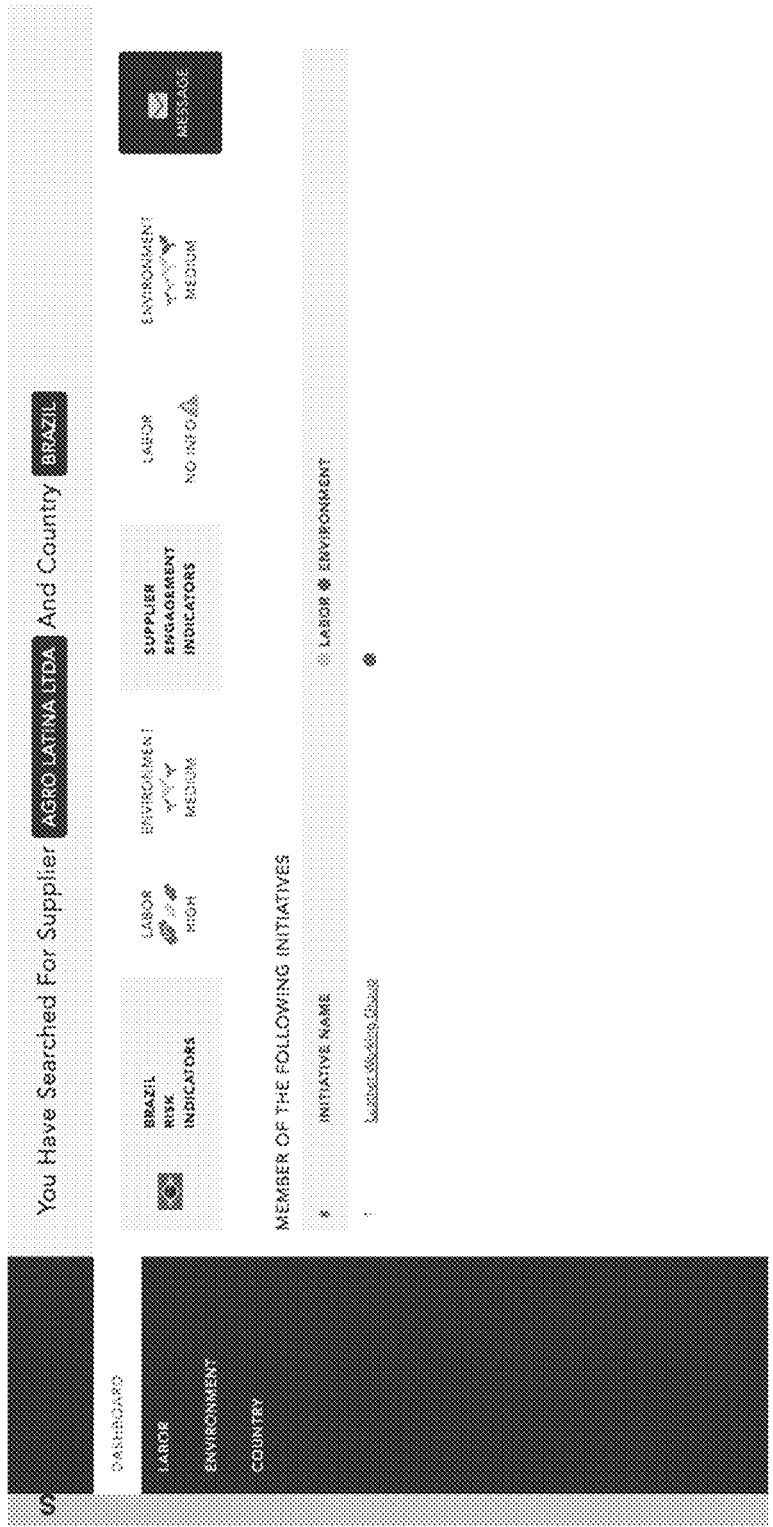
Figure 53:
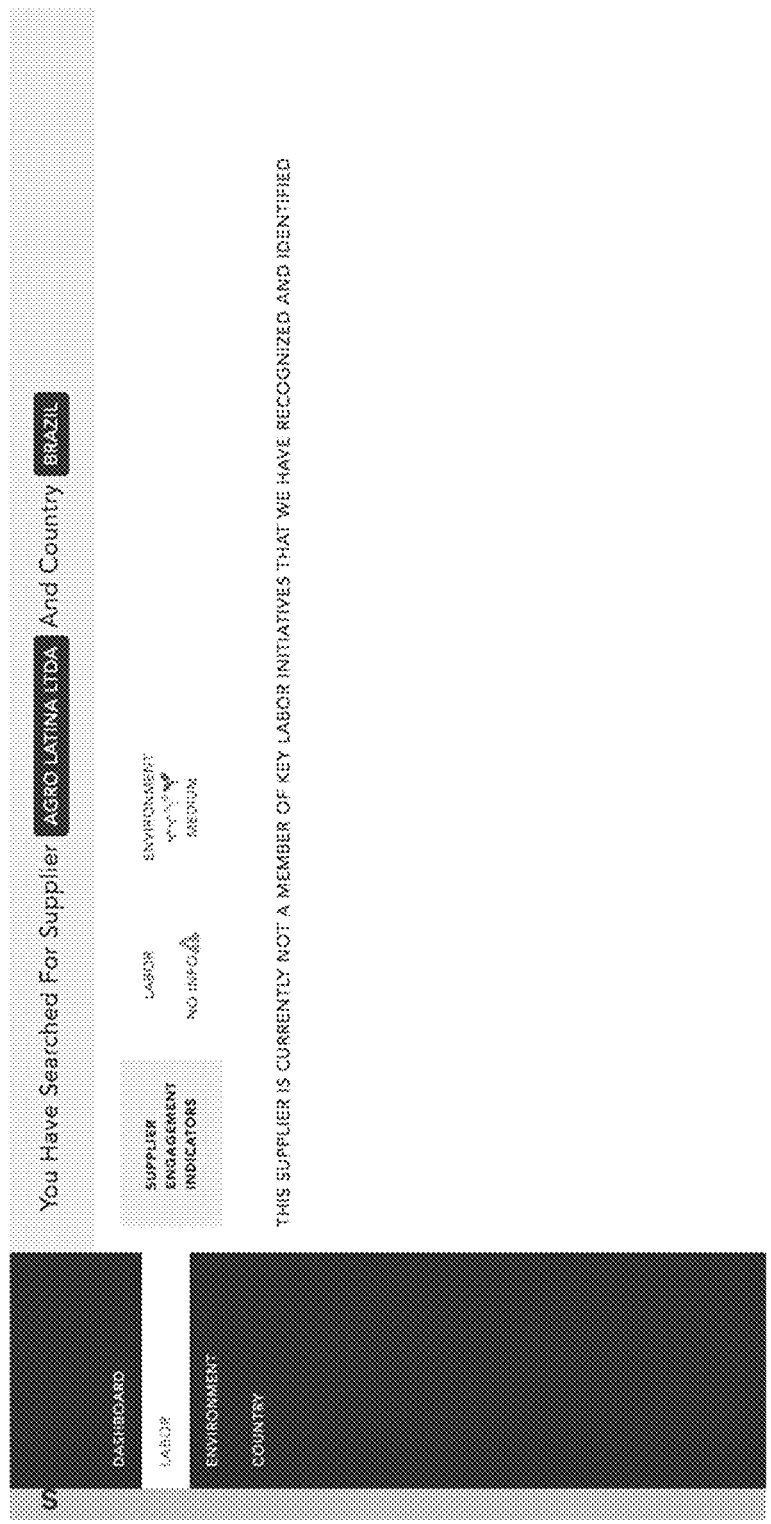
Figure 55:
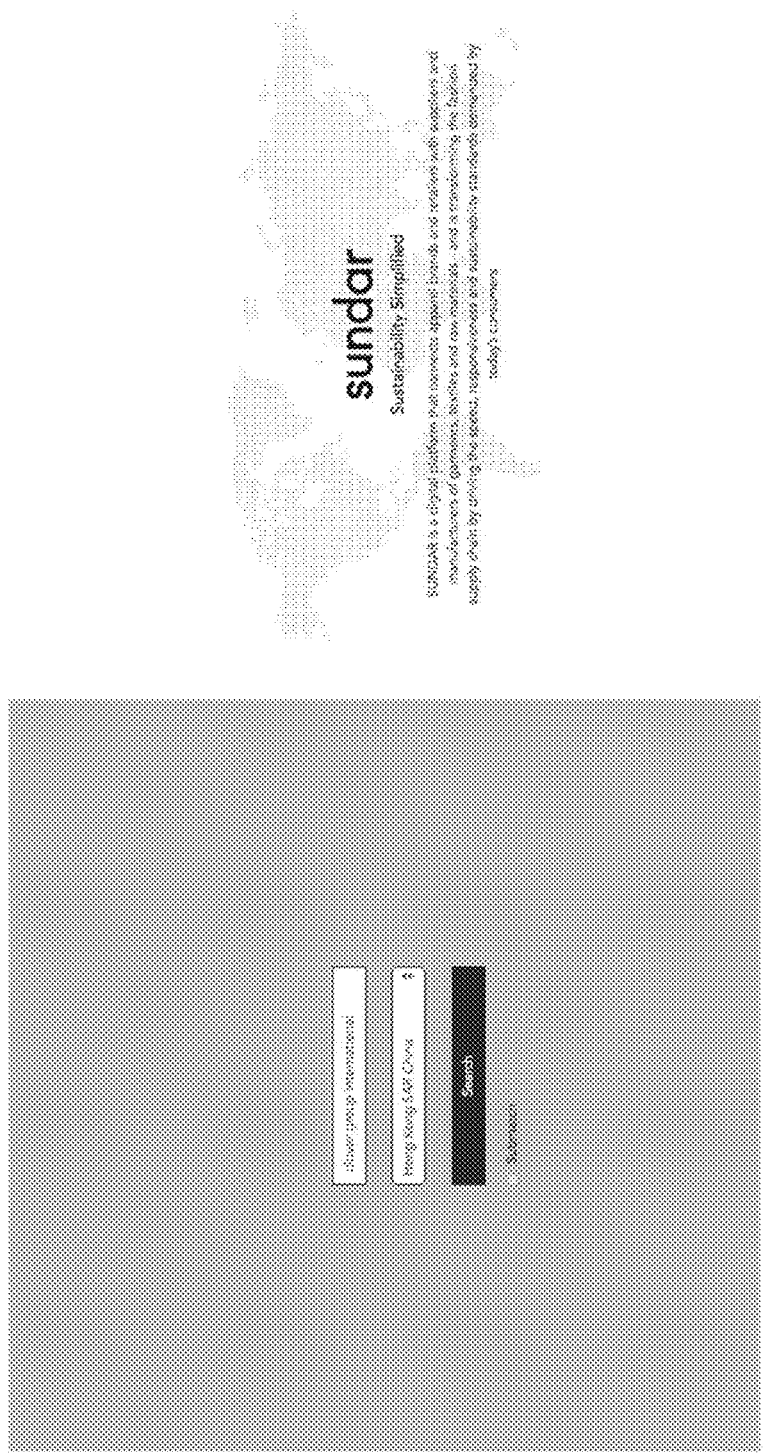
Figure 56:
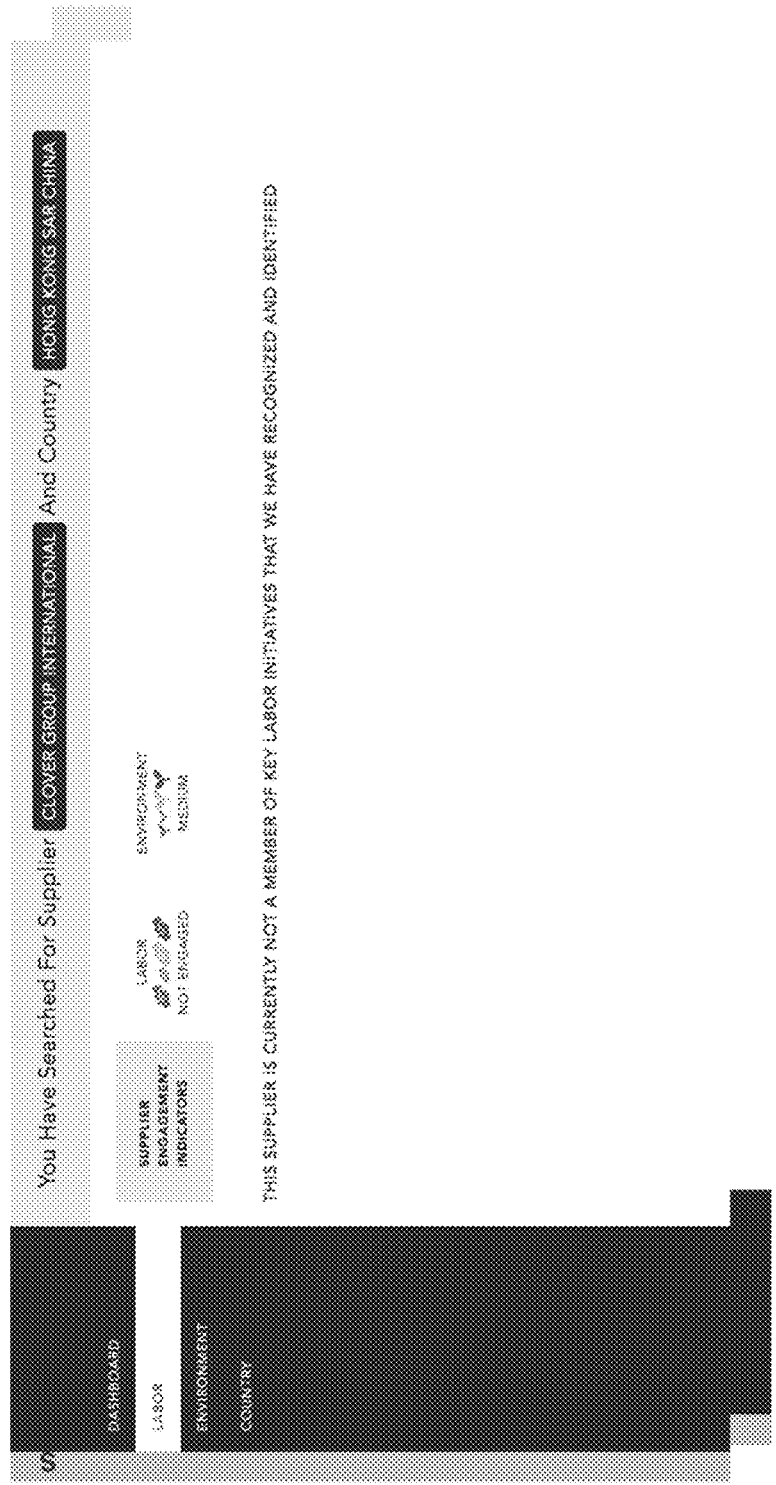

FIG. 16B is a block diagram of any internal structure of a computer/computing node (e.g., client processor/device 150 or server computers 160) in the processing environment of FIG. 16A, which may be used to facilitate displaying audio, image, video or data signal information. Each computer 150, 160 in FIG. 16B contains a system bus 110, where a bus is a set of actual or virtual hardware lines used for data transfer among the components of a computer or processing system. The system bus 110 is essentially a shared conduit that connects different elements of a computer system (e.g., processor, disk storage, memory, input/output ports, etc.) that enables the transfer of data between elements.

Attached to the system bus 110 is an I/O device interface 82 for connecting various input and output devices (e.g., keyboard, mouse, touch screen interface, displays, printers, speakers, audio inputs and outputs, video inputs and outputs, microphone jacks, etc.) to the computer 150, 160. A network interface 113 allows the computer to connect to various other devices attached to a network (for example the network illustrated at 170 of FIG. 16A). Memory 114 provides volatile storage for computer software instructions 115 and data 116 used to implement software implementations of device reputation integrity, attestation, and authentication components of some embodiments of the present invention.

In an example mobile implementation, a mobile agent implementation of the invention may be provided. A client server environment can be used to enable mobile security services using the server 160 (e.g., attestation server, scoring server). It can use, for example, the XMPP protocol to tether a device authentication engine/agent 115 on the device 150 to a server 160. The server 160 can then issue commands to the mobile phone on request. The mobile user interface framework to access certain components of the system 100 may be based on XHP, Javelin and WURFL. In another example mobile implementation for OS X and iOS operating systems and their respective APIs, Cocoa and Cocoa Touch may be used to implement the client side components 115 using Objective-C or any other high-level programming language that adds Smalltalk-style messaging to the C programming language.

Disk storage 95 provides non-volatile storage for computer software instructions 115 (equivalently "OS program") and data 116 used to implement embodiments of the system 100. The system may include disk storage accessible to the computers/devices 150. Central processor unit 84 is also attached to the system bus 110 and provides for the execution of computer instructions.

In an example embodiment, the processor routines 115 and data 116 are computer program products. For example, if aspects of the inventive system 100 may include both server side and client side components.

In an example embodiment, authenticators/attesters/marketplace/supply chain monitoring may be contacted via instant messaging applications, video conferencing systems, VOIP systems, email systems, etc., all of which may be implemented, at least in part, in software 115, 116. In another example embodiment, the scoring engine/service may be implemented as an application program interface (API), executable software component, or integrated component of the OS configured to authenticate users on a Trusted Platform Module (TPM) executing on a computing device 150.

Software implementations 115, 116 may be implemented as a computer readable medium capable of being stored on a storage device 95, which provides at least a portion of the software instructions for the system 100. Executing instances of respective software components of the system 100 may be implemented as computer program products 115, and can be installed by any suitable software installation procedure, as is well known in the art. In another embodiment, at least a portion of the system software instructions 115 may be downloaded over a cable, communication and/or wireless connection via, for example, a browser SSL session or through an app (whether executed from a mobile or other computing device). In other embodiments, the system 100 software components 115, may be implemented as a computer program propagated signal product embodied on a propagated signal on a propagation medium (e.g. a radio wave, an infrared wave, a laser wave, a sound wave, or an electrical wave propagated over a global network such as the Internet, or other networks. Such carrier medium or signal provides at least a portion of the software instructions for the present methods/systems 200 of FIG. 16B.

While example embodiments have been particularly shown and described, it will be understood by those skilled in the art that various changes in form and details may be made therein without departing from the scope of the embodiments encompassed by the appended claims.

For example, while reference is made to certain phrases, such as "the present invention", "invention", "inventive supply chain monitoring and marketplace attestation blockchain system", "supply chain system", "marketplace system" or the like, it should be understood that there are many embodiments of the invention(s) described herein, including several different example implementations, and the use of these phrases is to provide examples, but is not intended to be limiting, or to specifically require a technical feature.

What is claimed is:

1. An apparatus for establishing trustworthiness in a supply chain network by determining and quantifying supplier trade and environmental sustainability risk of suppliers in the supply chain network, the apparatus comprising:
    a supply chain network including a plurality of suppliers having respective supplier nodes; and
    an analytics engine implementing an immutable blockchain-based database, the analytics engine including:
    a computer-based memory configured to store in the database: (i) a mathematical model specific to an industry; and (ii) supplier data provided by the plurality of suppliers;
    a processor coupled to the computer-based memory, the processor configured to: (i) identify target data of the supplier data, associated with trade and environmental practices, in the industry, of a supplier of the plurality of suppliers, in real-time; and (ii) use the mathematical model to compute a confidence score, for meeting a sustainability standard, for the supplier based on the target data, where the computed confidence score of the supplier in the supply chain network quantifies supplier trade and environmental sustainability risk of the supplier in the supply chain network, thereby establishing a level of trustworthiness in the supply chain network;
    the mathematical model computed via a scoring engine to produce the confidence score based on a combination of parameters including determining whether the supplier passes at least one parameter of the combination of parameters based on target data;
    the processor configured to implement a data mining process to identify the target data, where the data mining process includes processing a web link to identify the target data and wherein the processor is further configured to determine whether the supplier passes the at least one parameter based on the target data;

wherein processing the web link includes using real-time website pinging to retrieve underlying web elements that store the target data;

wherein, in an event a web element of the underlying web elements is known, the data mining process further includes processing the web element using Server-Side jQuery; and wherein, in an event a web element of the underlying web elements is not known, the data mining process further includes parsing a webpage, accessed via the web link, wherein the parsing includes extracting data and sending the data extract to a Python text processing server for identifying the target data from the data sent.

2. The apparatus of claim 1, wherein the industry is a fashion industry and the supply chain network is a fashion supply chain communications network; and wherein the sustainability standard represents a labor, health, safety, or environmental sustainability standard, or a combination thereof.

3. The apparatus of claim 1, wherein one or more of the nodes in the supply chain network are associated with trustworthiness determined by a consensus algorithm; the trustworthiness reflected by a confidence score reflecting their level of trustworthiness in the supply chain network.

4. The apparatus of claim 1, wherein the mathematical model computed by a scoring engine is configured to employ a combination of parameters to produce the score; wherein the combination of parameters includes a membership parameter and wherein the membership parameter indicates membership or certification of the supplier in a labor or environmental organization.

5. The apparatus of claim 4, wherein the combination of parameters further includes a location parameter and wherein the location parameter indicates a country risk on the supplier supplying to a given country, the country risk based on an international labor organization country risk assessment for the given country;

the combination of parameters further includes a buyer parameter and wherein the buyer parameter indicates whether the supplier supplies to buyers in a curated list, the buyers in the curated list associated with buyer scores, each buyer score based on an assessment of respective corporate social responsibility and engagement effort of the buyer in sustainable labor and environmental practices; and the combination of parameters further includes a material ranking.

6. The apparatus of claim 4, wherein the processor is further configured to apply respective weights to parameters of the combination of parameters.

7. The apparatus of claim 4, wherein the Python text processing server is configured to use at least one machine learning system, the at least one machine learning system configured to determine whether the supplier is mentioned in the web page and, in an event the supplier is mentioned, the machine learning system is further to configured to determine whether the supplier is mentioned with a positive or negative reference.

8. The apparatus of claim 7, wherein the data mining process includes processing a portable document format (PDF) document, accessed via a link, to identify the target data;

wherein, in an event the PDF document is a report, the data mining process includes: using at least one machine learning method to check for reference to the supplier in the report and, in an event the supplier is referenced, the data mining process further includes sending the PDF document to a JAVA server, the JAVA server configured to determine whether the PDF document includes one or more PDF tables.

9. The apparatus of claim 8, wherein, in an event it is determined that the PDF document does include the one or more PDF tables, the processor is further configured to identify and extract the target data from the one or more PDF tables;

wherein the data mining process includes processing text content to identify the target data and wherein the processor is further configured to determine whether the supplier passes the at least one parameter based on the target data; and wherein the data mining process includes mining web links for the target data on a scheduled basis.

10. The apparatus of claim 9, wherein the data mining process includes mining web links, PDF documents, or text content to identify and extract the target data; and wherein the data mining process includes storing the target data in an Object Storage database with a timestamp of the storing.

11. The apparatus of claim 2, wherein the data mining process includes storing the target data in an Object Storage database with a timestamp of the storing.

12. The apparatus of claim 2, wherein the data mining process includes mining data stored in the blockchain-based database.

13. The apparatus of claim 1, wherein the processor is electronically coupled to a blockchain network supporting the blockchain-based database, wherein the blockchain network is in communication with the supply chain network; and wherein the processor is further configured to execute a smart contract, the smart contract configured to register participants of the supply chain network; where the blockchain network is a portion of a supply chain monitoring system.

14. The apparatus of claim 13, wherein the smart contract is further configured to register factory location information of the supplier, capacity information of the supplier, or the score of the supplier, or a combination thereof, on the blockchain network.

15. The apparatus of claim 14, wherein an attestation of correctness or incorrectness of the capacity information of the supplier is registered to the blockchain network, the attestation registered by at least one validator configured to examine capacity data that has been entered into the blockchain network and validate correctness thereof.

16. The apparatus of claim 1, further comprising a human-machine interface, wherein the processor is further configured to provide a recommendation to a user via the human-machine interface, and wherein the recommendation is for using the supplier to obtain a resource.

17. The apparatus of claim 13 further comprising the processor registering factory location information of the supplier, capacity information of the supplier, or the score of the supplier, or a combination thereof, on the blockchain network;

the processor executing processes to examine capacity information of the supplier entered into the blockchain network and validating correctness thereof; and the processor registering an attestation of correctness or incorrectness of the capacity information validated to the blockchain network; and the processor causing a recommendation to be delivered to a user device, wherein the recommendation is for using the supplier to obtain a resource.

18. The apparatus of claim 13 wherein the processor is directed to securely handle a request for proposal (RFP) from the blockchain network including:

transmitting an RFP request from a client device in the supply chain network to an attestation server, the RFP request being signed and securely transmitted from a trusted entity in the blockchain network;

receiving at the attestation server the securely transmitted RFP, the attestation server configured with a consensus of the trustworthiness of respective supply nodes of the blockchain network;

in response to determining which supply nodes in the blockchain network meet a threshold level of trustworthiness, allowing the RFP to be transmitted to one or more of the supply nodes meeting the threshold, the transmitted RFP request returning a response from one or more of the respective supply nodes having met the threshold level of trustworthiness; and transmitting the response to the client device in the supply chain network, the response being signed and securely transmitted from blockchain network.

19. A computer-implemented method of establishing trustworthiness in a supply chain network by determining and quantifying supplier trade and environmental sustainability risk of suppliers in the supply chain network, the method comprising:

storing, in an immutable blockchain-based database: (i) a mathematical model specific to an industry; and (ii) supplier data provided by a plurality of suppliers in a supply chain network;

identifying target data of the supplier data, associated with trade and environmental practices, in the industry, of a supplier of the plurality of suppliers, in real-time and using the mathematical model to compute a confidence score, for meeting a sustainability standard, for the supplier based on the target data, where the computed confidence score of the supplier in the supply chain network quantifies supplier trade and environmental sustainability risk of the supplier in the supply chain network, thereby establishing a level of trustworthiness in the supply chain network;

computing the mathematical model via a scoring engine to produce the confidence score based on a combination of parameters including determining whether the supplier passes at least one parameter of the combination of parameters based on target data;

implementing a data mining process to identify the target data, where the data mining process includes processing a web link to identify the target data and wherein the processor is further configured to determine whether the supplier passes the at least one parameter based on the target data;

wherein processing the web link includes using real-time website pinging to retrieve underlying web elements that store the target data;

wherein, in an event a web element of the underlying web elements is known, the data mining process further includes processing the web element using Server-Side jQuery; and wherein, in an event a web element of the underlying web elements is not known, the data mining process further includes parsing a webpage, accessed via the web link, wherein the parsing includes extracting data and sending the data extract to a Python text processing server for identifying the target data from the data sent.

* * * * *

UNITED STATES PATENT AND TRADEMARK OFFICE
CERTIFICATE OF CORRECTION

PATENT NO. : 11,410,105 B2
APPLICATION NO. : 16/920307
DATED : August 9, 2022
INVENTOR(S) : Jagjeet Gill and Gavin Nicol It is certified that error appears in the above-identified patent and that said Letters Patent is hereby corrected as shown below:

In the Claims

In Claim 11, Column 20, Line 28, delete "of claim 2," and insert -- of claim 4, --.

In Claim 12, Column 20, Line 31, delete "of claim 2," and insert -- of claim 4, --.

Signed and Sealed this
Eleventh Day of October, 2022

Katherine Kelly Vidal
*Director of the United States Patent and Trademark Office*